United States Patent
Kamiyoshi et al.

(10) Patent No.: US 9,490,037 B2
(45) Date of Patent: Nov. 8, 2016

(54) CLAMPER AND IN-CHANNEL-HEAD OPERATION DEVICE

(75) Inventors: Atsushi Kamiyoshi, Tokyo (JP); Jun Fujita, Tokyo (JP); Hidekazu Tanaka, Hyogo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 516 days.

(21) Appl. No.: 13/818,524

(22) PCT Filed: Jul. 28, 2011

(86) PCT No.: PCT/JP2011/067339
§ 371 (c)(1),
(2), (4) Date: Feb. 22, 2013

(87) PCT Pub. No.: WO2012/026281
PCT Pub. Date: Mar. 1, 2012

(65) Prior Publication Data
US 2013/0152385 A1   Jun. 20, 2013

(30) Foreign Application Priority Data
Aug. 23, 2010 (JP) .................. 2010-186628

(51) Int. Cl.
*G21D 1/00* (2006.01)
*B23Q 1/00* (2006.01)
(Continued)

(52) U.S. Cl.
CPC ............... *G21D 1/02* (2013.01); *B23P 19/022* (2013.01); *B23P 19/025* (2013.01); *B23Q 1/009* (2013.01);
(Continued)

(58) Field of Classification Search
CPC .... B23Q 1/0081; B23Q 1/009; B23Q 3/082; F22B 37/003; F22B 37/005; F22B 37/20
USPC ............ 29/252, 726; 269/32, 47; 254/133 R, 254/93 R
See application file for complete search history.

(56) References Cited

U.S. PATENT DOCUMENTS 3,367,011 A * 2/1968 Sipher .................. B25B 27/026
29/252
3,791,011 A   2/1974 Keys
(Continued)

FOREIGN PATENT DOCUMENTS

JP    59-097864 A    6/1984
JP    62-061885 A    3/1987
(Continued)

OTHER PUBLICATIONS

English Translation of Written Opinion of the International Searching Authority dated Sep. 13, 2011, corresponding to Application No. PCT/JP2011/067339. (4 pages).
(Continued)

*Primary Examiner* — Monica Carter
*Assistant Examiner* — Seahee Yoon
(74) *Attorney, Agent, or Firm* — Westerman, Hattori, Daniels & Adrian, LLP

(57) ABSTRACT

A clamper (23) includes a clamp mechanism (231) which inserts an insertion portion (2311a) into a tube member and clamps the tube member and a lifting and lowering mechanism (232) which lifts and lowers the clamp mechanism (231) in the insertion direction of the insertion portion (2311a). The clamp mechanism (231) includes a clamp body (2311) which has the insertion portion (2311a), a cotter (2312) which protrudes from the insertion portion (2311a) to come into friction-contact with the tube member and is movable in a reciprocating manner in the insertion direction of the insertion portion (2311a), a piston rod (2313) which presses the cotter (2312) so that the cotter protrudes from the insertion portion (2311a) when being pulled toward the opposite side to the insertion direction of the insertion portion (2311a), and a rod cylinder (2315) which is integrated with the clamp body (2311) and pulls the piston rod (2313).

6 Claims, 18 Drawing Sheets

(51) Int. Cl.
  *B25B 5/08*   (2006.01)
  *B23P 19/02*  (2006.01)
  *F22B 37/00*  (2006.01)
  *F22B 37/20*  (2006.01)
  *G21C 17/01*  (2006.01)
  *G21D 1/02*   (2006.01)

(52) U.S. Cl.
  CPC ........... *F22B 37/003* (2013.01); *F22B 37/005* (2013.01); *F22B 37/20* (2013.01); *G21C 17/01* (2013.01); *G21D 1/006* (2013.01); *B25B 5/087* (2013.01); *Y02E 30/40* (2013.01); *Y10T 29/53113* (2015.01)

(56) References Cited

U.S. PATENT DOCUMENTS

| | | | |
|---|---|---|---|
| 4,312,124 A | | 1/1982 | Calhoun |
| 4,679,315 A | * | 7/1987 | Overbay ............... B23P 19/025 29/252 |
| 4,728,217 A | | 3/1988 | Fink |
| 4,771,526 A | | 9/1988 | Arzenti et al. |
| 4,909,493 A | * | 3/1990 | Yonezawa ............... B25B 5/087 269/309 |
| 4,948,105 A | | 8/1990 | Yonezawa |
| 4,959,899 A | | 10/1990 | Martin |
| 6,024,354 A | * | 2/2000 | Yonezawa ............. B23Q 1/0081 269/309 |
| 6,095,509 A | | 8/2000 | Yonezawa |
| 6,241,228 B1 | | 6/2001 | Chupick |
| 6,902,159 B2 | | 6/2005 | Sawdon et al. |
| 7,303,186 B2 | | 12/2007 | Yonezawa et al. |
| 7,448,607 B2 | | 11/2008 | Steele et al. |
| 7,516,948 B2 | | 4/2009 | McIntosh et al. |
| 7,618,030 B2 | | 11/2009 | Yonezawa et al. |
| 8,376,336 B2 | | 2/2013 | McIntosh |
| 8,413,970 B2 | | 4/2013 | McIntosh |
| 8,444,128 B2 | | 5/2013 | Karras et al. |
| 2004/0046302 A1 | | 3/2004 | Bernhard et al. |
| 2005/0121846 A1 | * | 6/2005 | Kawakami ................... 269/309 |
| 2005/0200066 A1 | | 9/2005 | McClure |
| 2006/0033255 A1 | | 2/2006 | Yonezawa et al. |
| 2006/0049565 A1 | | 3/2006 | Petit et al. |
| 2009/0315239 A1 | | 12/2009 | Yonezawa et al. |
| 2011/0031670 A1 | | 2/2011 | Kawakami |
| 2011/0133381 A1 | | 6/2011 | Kawakami |
| 2011/0241331 A1 | | 10/2011 | Arisato |
| 2012/0098180 A1 | * | 4/2012 | Kawakami ..................... 269/20 |
| 2012/0319340 A1 | | 12/2012 | Kawakami |
| 2013/0153838 A1 | * | 6/2013 | Kamiyoshi et al. ...... 254/133 R |
| 2013/0249156 A1 | | 9/2013 | Haruna et al. |

FOREIGN PATENT DOCUMENTS

| | | |
|---|---|---|
| JP | 63-243606 A | 10/1988 |
| JP | 64-084191 A | 3/1989 |
| JP | 4-057083 U | 5/1992 |
| JP | 2503172 Y2 | 6/1996 |
| JP | 2007-183278 A | 7/2007 |

OTHER PUBLICATIONS

International Search Report for PCT/JP2011/067339, mailing date of Sep. 13, 2011.

International Search Report of PCT/JP2011/067338, mailing date of Sep. 13, 2011, with English translation (corresponds to U.S. Appl. No. 13/818,529) (6 pages).

Written Opinion dated Sep. 13, 2011, issued in Application No. PCT/JP2011/067338, with English translation (corresponds to U.S. Appl. No. 13/818,529) (6 pages).

Office Action dated May 8, 2015, issued in U.S. Appl. No. 13/818,529 (24 pages).

* cited by examiner

HEAT TRANSFER TUBE
UNCLAMPING PROCESS

HEAT TRANSFER TUBE
UNCLAMPING PROCESS

CLAMPER AND IN-CHANNEL-HEAD OPERATION DEVICE

FIELD

The present invention relates to a clamper and an in-channel-head operation device, and particularly, to a clamper capable of stably clamping and holding a tube member and an in-channel-head operation device having the clamper.

BACKGROUND

In a steam generator of a nuclear plant, an in-channel-head operation device is used to carry out an operation inside a water chamber. Further, in recent years, there has been proposed an in-channel-head operation device that has a manipulator of which a front end portion is equipped with a working tool. Further, since a floor surface of the water chamber has a spherical shape, there has been proposed a configuration in which such an indoor operation device is installed while being suspended from a tube sheet surface of the water chamber in order to improve the workability of the in-channel-head operation device. As such an in-channel-head operation device, a technique disclosed in Patent Literature 1 is known.

Here, a plurality of heat transfer tubes are opened and arranged on the tube sheet surface of the water chamber. Therefore, in such an in-channel-head operation device, there has been proposed a configuration in which a clamper is provided so as to clamp and hold the heat transfer tube by inserting a front end portion thereof into the heat transfer tube and the in-channel-head operation device is fixed to the tube sheet surface by the clamper. As an in-channel-head operation device having such a clamper, a technique disclosed in Patent Literature 2 is known.

CITATION LIST

Patent Literature

Patent Literature 1: Unexamined Japanese Patent Application No. 2007-183278
Patent Literature 2: Japanese Utility Model Registration No. 2503172

SUMMARY

Technical Problem

In the in-channel-head operation device, a manipulator increases in weight, and various force and moment act on the clamp mechanism by the operation of the manipulator during an operation inside the water chamber. For this reason, there has been a demand for the clamper to stably clamp and hold the heat transfer tube.

Therefore, the invention is made in view of such circumstances, and it is an object of the invention to provide a clamper capable of stably clamping and holding a tube member and an in-channel-head operation device having the clamper.

Solution to Problem

According to an aspect of the present invention, a clamper includes: a clamp mechanism which inserts an insertion portion into a tube member and clamps the tube member; and a lifting and lowering mechanism which lifts and lowers the clamp mechanism in the insertion direction of the insertion portion. The clamp mechanism includes a clamp body which includes the insertion portion, a cotter which protrudes from the insertion portion so as to come into friction-contact with the tube member and is disposed so as to be movable in a reciprocating manner in the insertion direction of the insertion portion, a piston rod which presses the cotter so that the cotter protrudes from the insertion portion when being pulled toward the opposite side to the insertion direction of the insertion portion, and a rod cylinder which is integrated with the clamp body and pulls the piston rod.

In the clamper, the lifting and lowering mechanism lifts the clamp mechanism so as to insert the insertion portion of the clamp mechanism into the tube member. Then, when the rod cylinder pulls the piston rod toward the opposite side to the insertion direction of the insertion portion (toward the rear end portion), the cotter is pressed by the piston rod so that the cotter protrudes from the insertion portion. Then, the cotter is pressed against the inner peripheral surface of the tube member so as to come into friction-contact therewith, thereby clamping the tube member. Accordingly, there is an advantage that the tube member may be stably clamped.

Advantageously, in the clamper, the piston rod passes through the rod cylinder and protrudes toward a rear end portion of the rod cylinder.

In the clamper, when the piston rod does not come off from the cotter by the fitting thereto upon unclamping the tube member, the piston rod may be separated from the cotter by beating the rear end portion of the piston rod from the outside. Accordingly, there is an advantage that the unclamping process may be carried out in an emergency state.

Advantageously, the clamper, further includes: a pressurizing device which is connected through a tube to a fluid chamber that pulls the piston rod by the pressurization of a working fluid among fluid chambers of the rod cylinder and pressurizes the working fluid of the fluid chamber; a check valve which is disposed on the tube; and a release valve which discharges the working fluid of the fluid chamber.

In the clamper, when the pressurizing device pressurizes the working fluid of the fluid chamber, the rod cylinder is lowered, and the cotter clamps and holds the tube member. At this time, the check valve prevents the reverse flow of the working fluid from the fluid chamber while the release valve is closed. Thus, even when the pressurizing device is stopped during an operation inside the water chamber (upon clamping the tube member), the fluid pressure of the fluid chamber is maintained, so that the state where the tube member is clamped is appropriately maintained. Accordingly, it is possible to realize the fail-safe when air leaks from the tube.

Advantageously, in the clamper, the clamp mechanism includes a cotter diameter decreasing structure which decreases the diameter of the cotter.

In the clamper, since the cotter may be accommodated inside the insertion portion by decreasing the diameter thereof upon unclamping the clamper, there is an advantage that the insertion portion may be easily extracted from the tube member.

Advantageously, in the clamper, the cotter diameter decreasing structure includes a tapered surface which is formed on the cotter and an elastic member which biases the tapered surface to the clamp body and decreases the diameter of the cotter by sliding the cotter along the tapered surface by the biasing force from the elastic member.

In the clamper, there is an advantage that the cotter diameter decreasing structure may be realized by a simple configuration with the tapered surface of the cotter and the elastic member.

Advantageously, in the clamper, the cotter diameter decreasing structure includes an annular elastic member which is fitted to the outer periphery of the cotter.

In the clamper, there is an advantage that the cotter diameter decreasing structure may be realized by a simple configuration with the annular elastic member.

According to another aspect of the present invention, an in-channel-head operation device includes any one of above described clamper.

Advantageous Effects of Invention

In the clamper according to the invention, the lifting and lowering mechanism lifts the clamp mechanism so as to insert the insertion portion of the clamp mechanism into the tube member. Then, when the rod cylinder pulls the piston rod toward the opposite side to the insertion direction of the insertion portion (toward the rear end portion), the piston rod presses the cotter so that the cotter protrudes from the insertion portion. Then, the cotter is pressed against the inner peripheral surface of the tube member so as to come into friction-contact therewith, thereby clamping the tube member. Accordingly, there is an advantage that the tube member may be stably clamped.

DESCRIPTION OF EMBODIMENTS

Figure 1:
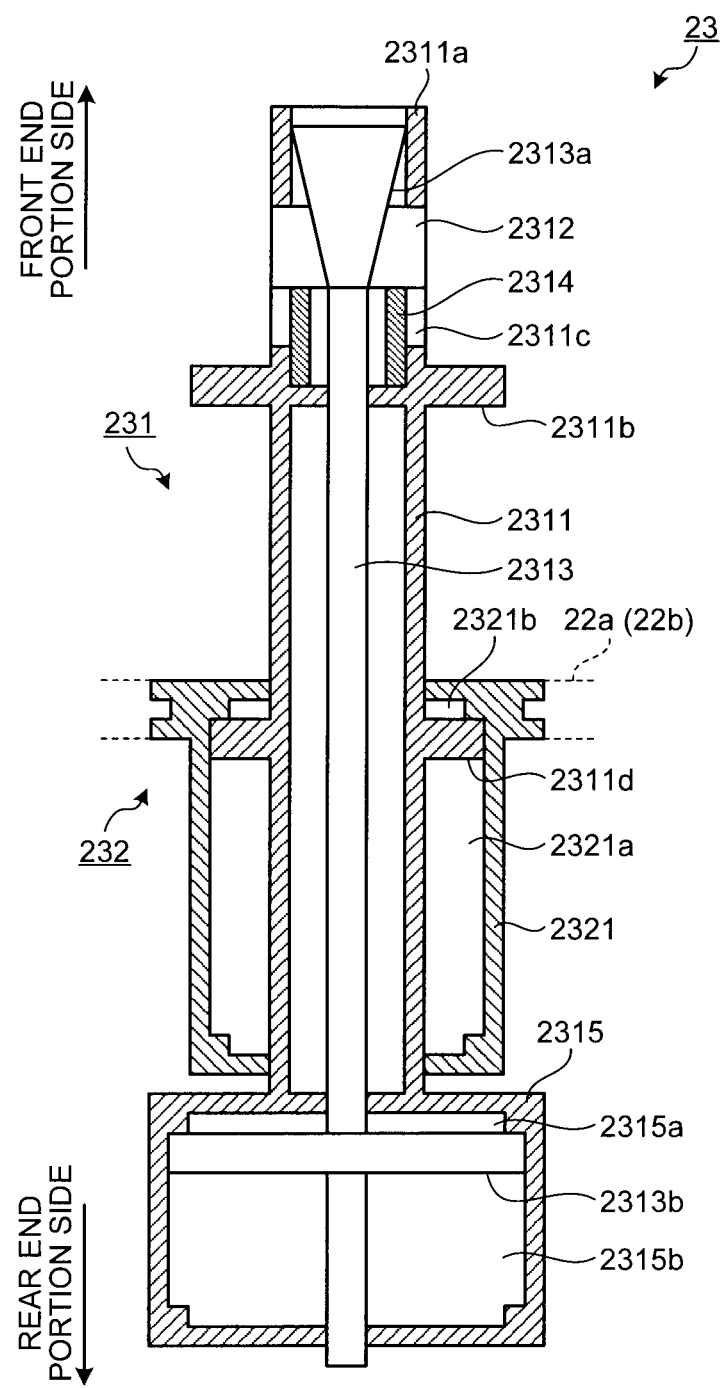
FIG. 1 is an axial cross-sectional view illustrating a clamper according to an embodiment of the invention.

Hereinafter, the invention will be described in detail by referring to the drawings. Furthermore, the invention is not limited to the embodiment. Further, constituents of the embodiment include a constituent which may be replaced or apparently replaced while maintaining the identity of the invention. Further, a plurality of modified examples described in the embodiment may be arbitrarily combined with each other within the scope which may be apparently supposed by the person skilled in the art.

[In-Channel-Head Operation Device]

Figure 15:
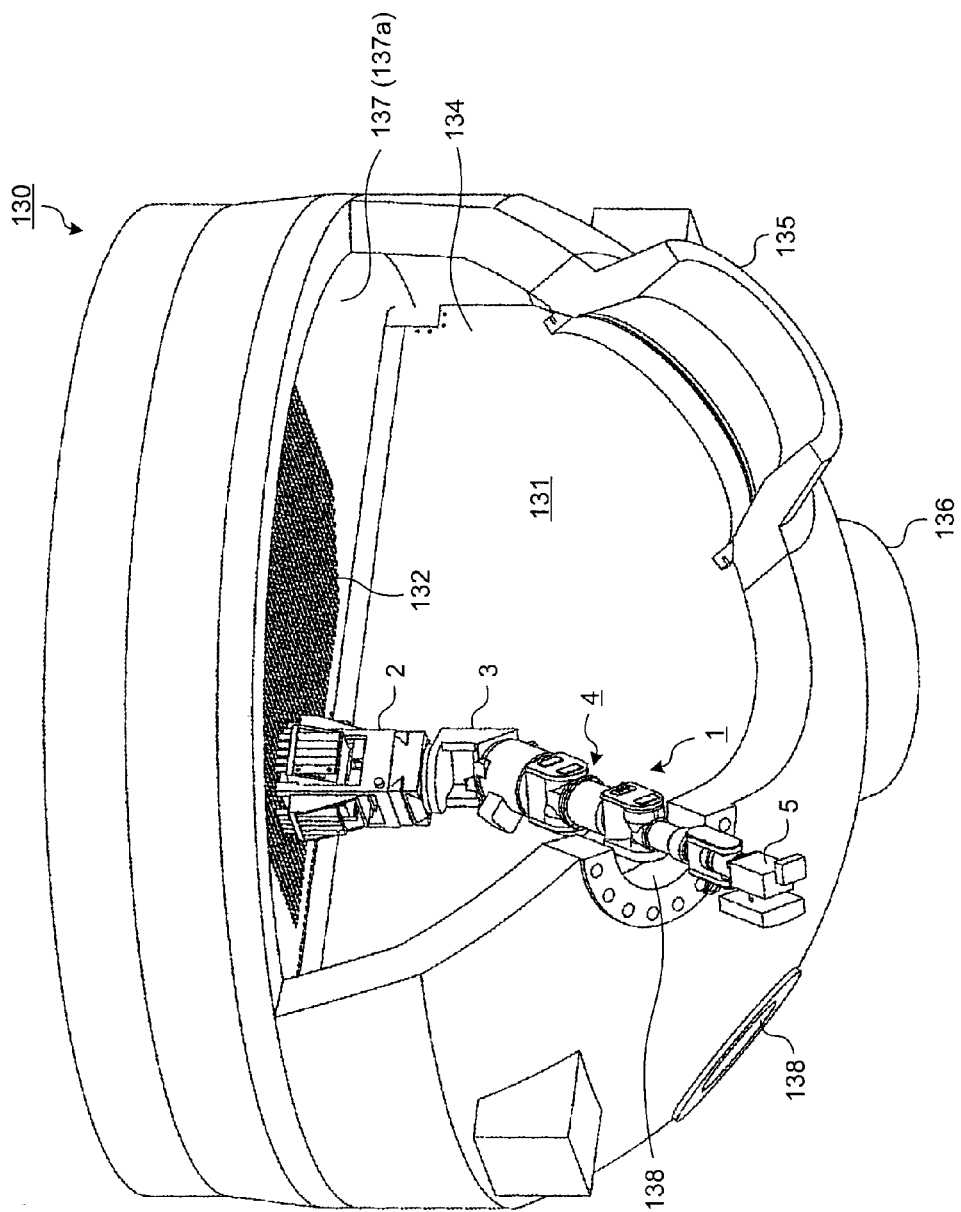
FIG. 15 is a perspective view illustrating an in-channel-head operation device of a steam generator.

A clamper 23 is applied to, for example, an in-channel-head operation device 1 which carries out an operation inside a water chamber in a steam generator 130 of a nuclear plant (see FIG. 15).

The in-channel-head operation device 1 is a device which is carried to a water chamber 131 of the steam generator 130, is installed therein, and is remotely operated so as to carry out an operation inside the water chamber. The in-channel-head operation device 1 includes a base 2, an intermediate link 3, a manipulator 4, and a tool 5. The base 2 is a device which becomes the base of the in-channel-head operation device 1, and is installed in a tube sheet surface 137a of the water chamber 131. The base 2 clamps and holds heat transfer tubes 132 of the tube sheet surface 137a so as to be fixed to the tube sheet surface 137a. The intermediate link 3 is a component which connects the base 2 to the manipulator 4 so as to incline a reference axis of the manipulator 4 with respect to the base 2 (the tube sheet surface 137a). The manipulator 4 is a multi-axis manipulator, and is installed so as to be hung from the tube sheet surface 137a of the water chamber 131 through the base 2 and the intermediate link 3. The manipulator 4 may change its posture by the remote operation. The tool 5 is a tool which corresponds to the operation inside the predetermined water chamber 131, and is attached to a front end portion of the manipulator 4. The tool 5 is, for example, a maintenance working tool which is used in the maintenance operation inside the water chamber, and includes an inspecting tool, a cutting tool, a welding tool, and the like.

In the in-channel-head operation device 1, the manipulator 4 is hung while being suspended from the tube sheet surface 137a of the water chamber 131, and carries out an operation inside the water chamber by moving the tool 5 through a change in posture while being rotated in this state. Accordingly, it is possible to realize an operation inside the water chamber in a wide range based on the base 2 of the tube sheet surface 137a. Further, the in-channel-head operation device 1 may move inside the water chamber 131 along the tube sheet surface 137a since the base 2 has a tube sheet walking function to be described later. Accordingly, since the work region inside the water chamber 131 is widened, the workability of the operation inside the water chamber 131 is improved. Furthermore, the operation inside the water chamber 131 includes, for example, an operation of welding an inlet tube stand 135, an outlet tube stand 136, the heat transfer tubes 132, a partition plate 134, and a tube sheet 137, an operation of inspecting a welded portion between the partition plate 134 and a water chamber glass portion, a maintenance operation, and the like.

[Base]

Figure 16:
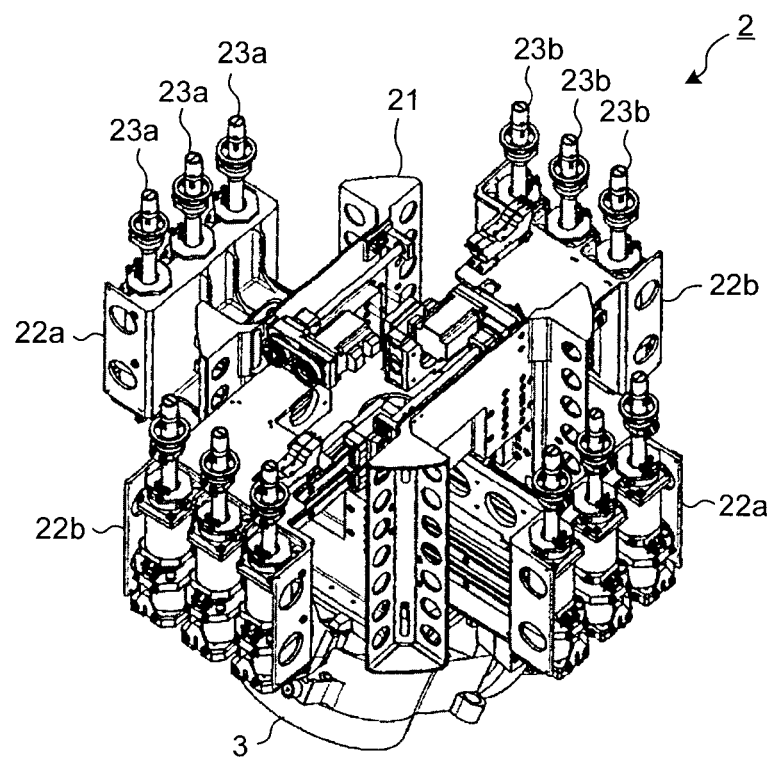
FIG. 16 is a perspective view illustrating a specific example of a base of the in-channel-head operation device described in FIG. 15.
Figure 17:
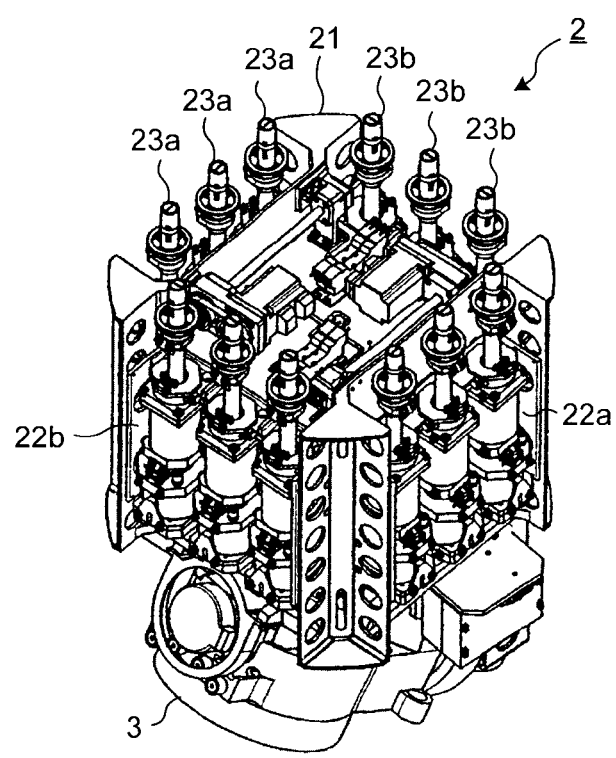
FIG. 17 is a perspective view illustrating a specific example of the base of the in-channel-head operation device described in FIG. 15.
Figure 18:
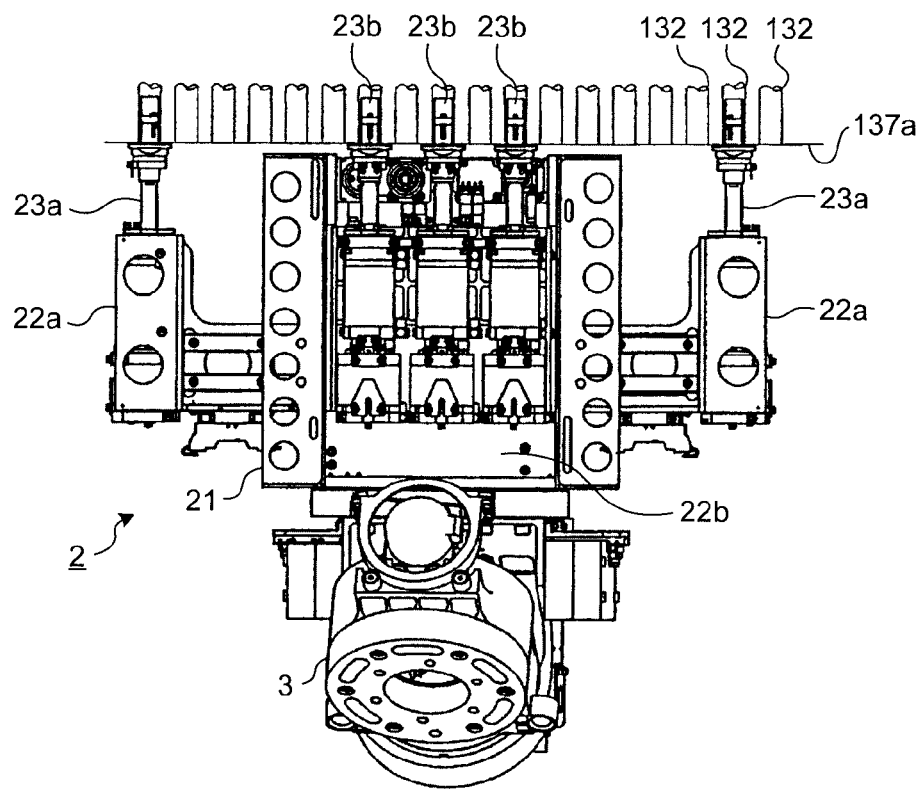
FIG. 18 is a diagram illustrating an installation state of the base described in FIG. 16.
Figure 19:
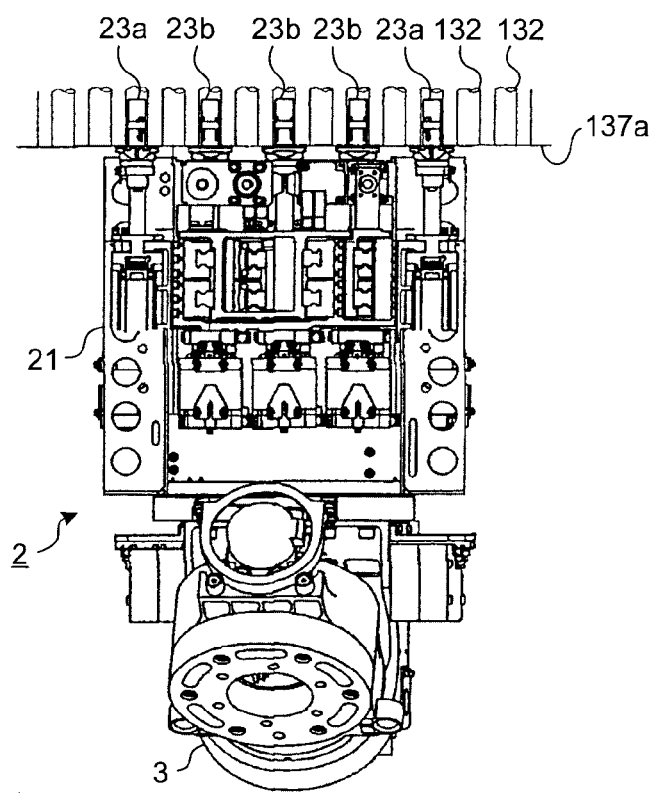
FIG. 19 is a diagram illustrating an installation state of the base described in FIG. 16.

FIGS. 16 and 17 are perspective views illustrating a specific example of the base of the in-channel-head operation device described in FIG. 15. FIGS. 18 and 19 are diagrams illustrating an installation state of the base described in FIG. 16. In these drawings, FIGS. 16 and 18 illustrate a state where the base opens all wings, and FIGS. 17 and 19 illustrate a state where the base closes all wings.

The base 2 includes a base body 21, four wings 22a and 22b, and a plurality of clampers 23a and 23b. The base body 21 is a rim-shaped casing. The four wings 22a and 22b are installed by being inserted into the base body 21. The wings 22a and 22b are driven by, for example, a telescopic ladder mechanism, and may slide in a direction perpendicular to each other with respect to the installation position of the base body 21 (see FIGS. 16 and 17). Further, the four wings 22a and 22b may slide in different directions, and are independently driven. The clampers 23a and 23b are mechanisms which insert the front end portions thereof into the heat transfer tubes 132 so as to clamp and hold the heat transfer tube 132. For example, in the embodiment, a set having three clampers 23a (23b) is installed in each end portion of each wing 22a (22b). Further, the clampers 23a (23b) are arranged in series so as to match the installation interval of the heat transfer tubes 132 in the tube sheet surface 137a. Furthermore, a specific configuration of the clampers 23a and 23b will be described later.

In the base 2, the respective clampers 23a and 23b insert the front end portions thereof into the heat transfer tubes 132 so as to clamp and hold the heat transfer tubes 132, and hence the base 2 is fixed while being suspended from the tube sheet surface 137a (see FIGS. 18 and 19). Further, the base 2 moves the wing 22a (22b) in a telescopic manner so as to slide the position of the clamper 23a (23b), and sequentially changes the clamping position of the clamper 23a (23b) with respect to the heat transfer tubes 132, so that the base may move along the tube sheet surface 137a (tube sheet walking) (not illustrated). Furthermore, the walking logic according to the tube sheet walking of such the base 2 may be arbitrarily adopted within the scope which may be apparently supposed by the person skilled in the art.

Embodiment

Clamper of Base

FIG. 1 is an axial cross-sectional view illustrating the clamper according to the embodiment of the invention.

Furthermore, in the embodiment, the side of the heat transfer tube 132 (the side of the tube sheet surface 137a of the water chamber 131) will be called the upper side or the front end portion side of the clamper and the opposite side (the floor surface side of the water chamber 131) will be called the lower side or the rear end portion side of the clamper.

The clamper 23 is a mechanism which inserts the front end portion thereof into the heat transfer tube 132 so as to clamp the heat transfer tube 132, and may be adopted as, for example, the clampers 23a and 23b of the base 2. The clamper 23 includes a clamp mechanism 231 and a lifting and lowering mechanism 232.

The clamp mechanism 231 is a mechanism which inserts a front end portion thereof into the heat transfer tube 132 so as to clamp the heat transfer tube 132 by the friction-contact, and includes a clamp body 2311, a cotter 2312, a piston rod 2313, an elastic body 2314, and a rod cylinder 2315.

The clamp body 2311 constitutes a body of the clamp mechanism 231. The axial front end portion of the clamp body 2311 is provided with an insertion portion 2311a which may be inserted into the heat transfer tube 132. Further, the clamp body 2311 includes a contact portion 2311b which may contact the tube sheet surface 137a of the heat transfer tube 132 while inserting the insertion portion 2311a into the heat transfer tube 132. For example, in the embodiment, the clamp body 2311 is formed as an elongated cylindrical member, and one end portion thereof is provided with the insertion portion 2311a. Further, the base of the insertion portion 2311a of the clamp body 2311 is provided with the flange-shaped contact portion 2311b, and in a state where the insertion portion 2311a is inserted into the heat transfer tube 132, the contact portion 2311b comes into plane-contact with an opening edge portion 132a of the heat transfer tube 132. Further, the insertion portion 2311a of the clamp body 2311 is provided with slits 2311c which correspond to the number of the installed cotters 2312.

The cotter 2312 is a member which is pressed into the inner peripheral surface of the heat transfer tube 132 so as to come into friction-contact with the surface when clamping the heat transfer tube 132, and is formed of, for example, metal or the like. The cotter 2312 is installed in the clamp body 2311, and is disposed so that the cotter protrudes from the insertion portion 2311a of the clamp body 2311 and to be accommodated in the insertion portion 2311a. Further, the cotter 2312 is disposed so as to be movable in a reciprocating manner in the axial direction of the clamp body 2311 with respect to the insertion portion 2311a. For example, in the embodiment, the slit 2311c is formed in the insertion portion 2311a of the clamp body 2311, and the cotter 2312 is inserted and disposed in the slit 2311c. Further, the cotter 2312 is disposed inside the slit 2311c so as to be movable in a reciprocating manner in the radial direction and the axial direction of the clamp body 2311.

The piston rod 2313 is a rod which drives the cotter 2312, and is inserted into the clamp body 2311 so as to be movable in a reciprocating manner in the axial direction of the clamp body 2311. The piston rod 2313 includes a tapered front end portion, and is disposed so as to contact the cotter 2312 while a tapered surface 2313a faces the rear end portion of the clamp body 2311. Further, when the piston rod 2313 is pulled toward the rear end portion of the clamp body 2311, the tapered surface 2313a presses the inner peripheral surface of the cotter 2312 so as to protrude from the clamp body 2311. Further, the rear end portion of the piston rod 2313 is provided with a piston portion 2313b.

The elastic body 2314 is a member which disposes the cotter 2312 on the upper portion of the slit 2311c, and is formed by, for example, a coil spring or a rubber tube. The elastic body 2314 is inserted into the clamp body 2311, and is supported by the clamp body 2311 so as to be biased to the rear end portion of the cotter 2312. The cotter 2312 is held in the upper portion of the slit 2311c by the biasing force of the elastic body 2314.

The rod cylinder 2315 constitutes a piston and cylinder mechanism which uses the piston rod 2313 (piston portion 2313b) as a piston. The rod cylinder 2315 is integrally formed with the rear end portion of the clamp body 2311, and drives the piston rod 2313 so as to displace in a reciprocating manner in the axial direction of the clamp body 2311. Further, the rod cylinder 2315 receives a fluid pressure from an external fluid pressure mechanism (not illustrated). Then, the piston rod 2313 is driven by the control of the fluid pressure. For example, in the embodiment, the rod cylinder 2315 is divided into a first fluid chamber 2315*a* and a second fluid chamber 2315*b* through the piston portion 2313*b* of the piston rod 2313. Then, the piston rod 2313 is pulled toward the rear end portion of the clamp body 2311 by the pressurization of the working fluid of the first fluid chamber 2315*a*. Accordingly, the tapered surface 2313*a* of the piston rod 2313 pressurizes the cotter 2312, so that the cotter 2312 protrudes from the clamp body 2311. Further, the piston rod 2313 is pressed toward the front end portion of the clamp body 2311 by the pressurization of the working fluid of the second fluid chamber 2315*b*. Accordingly, the tapered surface 2313*a* of the piston rod 2313 releases the pressurization toward the cotter 2312, so that the cotter 2312 is accommodated in the clamp body 2311.

The lifting and lowering mechanism 232 is a mechanism which lifts and lowers the clamp mechanism 231, and includes a lifting and lowering cylinder 2321. The lifting and lowering cylinder 2321 constitutes a piston and cylinder mechanism which uses the clamp body 2311 (piston portion 2311*d*) as a piston. Further, the lifting and lowering cylinder 2321 is directly connected to the rod cylinder 2315 of the clamp mechanism 231. Further, the lifting and lowering cylinder 2321 is fixed to the wing 22*a* (22*b*) of the base 2. Accordingly, the clamper 23 is fixed and held by the wing 22*a* (22*b*) of the base 2 through the lifting and lowering cylinder 2321. The lifting and lowering cylinder 2321 receives a fluid pressure from an external fluid pressure mechanism (not illustrated). Then, the clamp body 2311 as the piston displaces in a reciprocating manner by the control of the fluid pressure, so that the clamp mechanism 231 is lifted and lowered. For example, in the embodiment, the lifting and lowering cylinder 2321 is divided into a first fluid chamber 2321*a* and a second fluid chamber 2321*b* through the piston portion 2311*d* of the clamp body 2311. Then, the clamp body 2311 is pressed toward the front end portion by the pressurization of the working fluid of the first fluid chamber 2321*a*, so that the clamp body 2311 is lifted. Further, the clamp body 2311 is pulled toward the rear end portion by the pressurization of the working fluid of the second fluid chamber 2321*b*, so that the clamp body 2311 is lowered.

[Process of Clamping Heat Transfer Tube]

Figure 2:
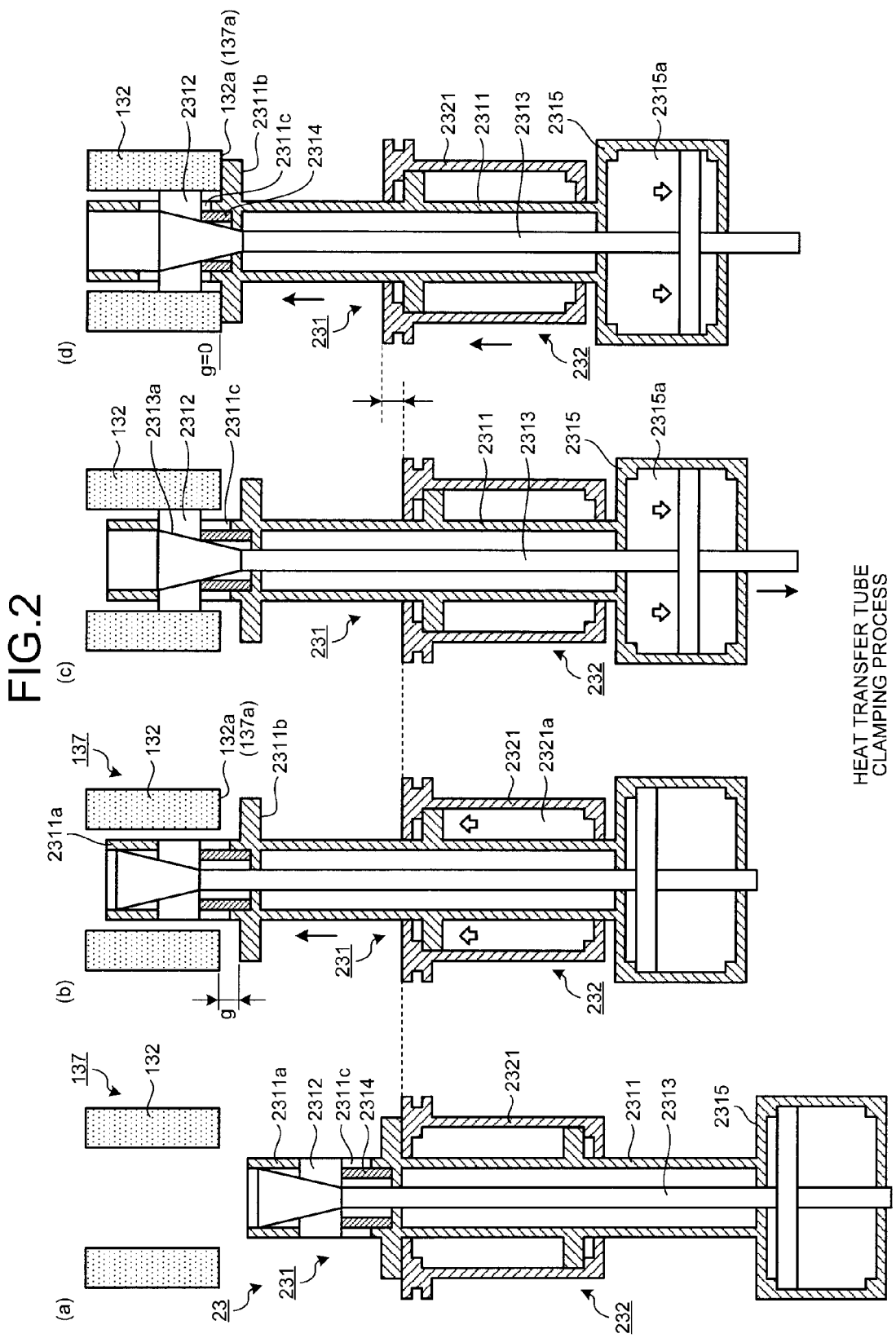
FIG. 2 is a diagram illustrating a clamping process of the clamper described in FIG. 1.
Figure 20:
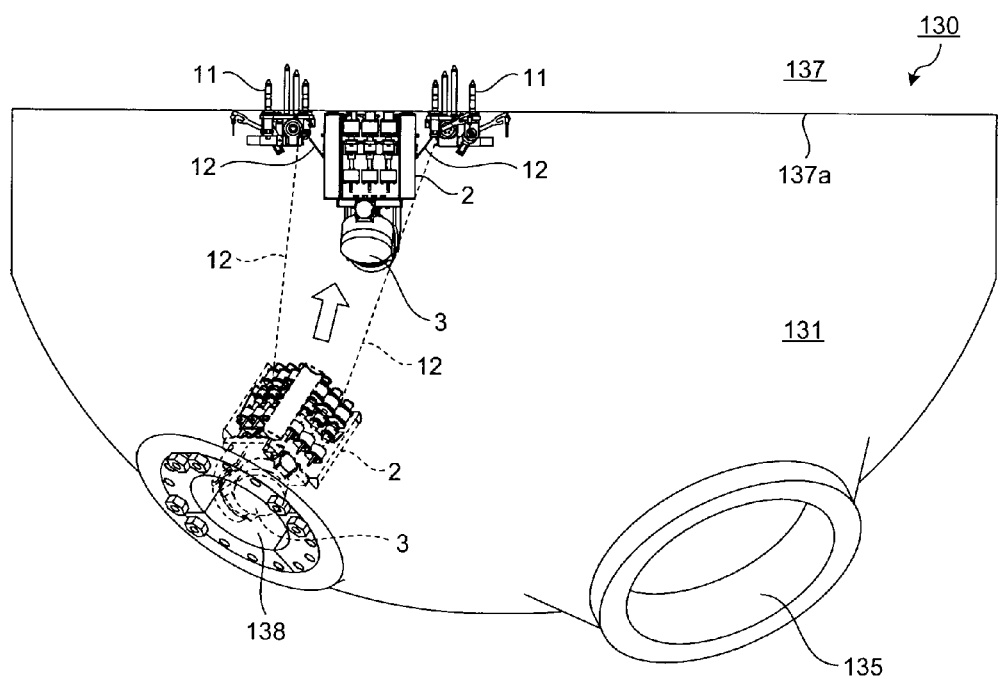
FIG. 20 is a diagram illustrating an installation process of the base.

FIG. 20 is a diagram illustrating a process of installing the base 2. FIG. 2 is a diagram illustrating a clamping process of the clamper described in FIG. 1. In these drawings, FIG. 20 illustrates a process (a base installing process) in which the assembled structure of the base 2 and the intermediate link 3 is carried to the water chamber 131 and is installed in the tube sheet surface 137*a*, and FIG. 2 illustrates a state where the clamper 23 of the base 2 clamps and holds the heat transfer tube 132 in the base installing process.

In the process of installing the base 2, a pair of base carrying attachment fixtures 11 is attached to the tube sheet surface 137*a* of the water chamber 131, and the assembled structure of the base 2 and the intermediate link 3 is carried from a manhole 138 into the water chamber 131 (see FIG. 20). Then, the base carrying attachment fixtures 11 hold the assembled structure so as to be hung to the tube sheet surface 137*a* through a wire or belt 12. Subsequently, the base 2 inserts the front end portions of the clampers 23*a* and 23*b* (the insertion portion 2311*a* of the clamp mechanism 231) into the heat transfer tube 132 so as to clamp and hold the heat transfer tube 132.

In the process in which the clamper 23 clamps the heat transfer tube 132, as the initial state, the clamper 23 is first disposed so that the axial direction is aligned to the vertical direction while the front end portion (the insertion portion 2311*a* of the clamp mechanism 231) faces the heat transfer tube 132 (see FIG. 2(*a*)). Further, the clamper 23 is fixed to the wing 22*a* (22*b*) of the base 2 in the lifting and lowering cylinder 2321 of the lifting and lowering mechanism 232. Further, in a state where the piston rod 2313 is pressed toward the front end portion of the clamp body 2311, the cotter 2312 is accommodated inside the slit 2311*c* of the clamp body 2311 while decreasing in diameter. Further, in a state where the elastic body 2314 is lengthened, the cotter 2312 is pressed upward toward the front end portion inside the slit 2311*c* of the clamp body 2311. Further, in a state where the lifting and lowering mechanism 232 lowers the clamp mechanism 231, the insertion portion 2311*a* is positioned at the side near the heat transfer tube 132.

Next, the lifting and lowering mechanism 232 pressurizes the working fluid of the first fluid chamber 2321*a* of the lifting and lowering cylinder 2321 so as to lift the clamp mechanism 231 (see FIG. 2(*b*)). Accordingly, the insertion portion 2311*a* of the clamp mechanism 231 is inserted into the heat transfer tube 132. At this time, since the lifting and lowering cylinder 2321 is held at the side of the base body 21 (the wing 22*a* (22*b*)) and the base body 21 is held while being hung by the wires 12 of the base carrying attachment fixtures 11 (see FIG. 20), the height position of the lifting and lowering cylinder 2321 is constantly maintained. Further, in this state, the contact portion 2311*b* of the clamp body 2311 and the opening edge portion 132*a* of the heat transfer tube 132 (the tube sheet surface 137*a*) normally comes into close contact with each other (a gap g may be generated depending on the conditions).

Next, the clamp mechanism 231 pressurizes the working fluid of the first fluid chamber 2315*a* of the rod cylinder 2315 (see FIG. 2(*c*)). Then, the piston rod 2313 is pulled toward the rear end portion of the clamp body 2311 so as to be lowered, and the tapered surface 2313*a* presses and opens the cotter 2312 so as to increase the diameter of the cotter 2312. Then, the cotter 2312 protrudes from the slit 2311*c* of the clamp body 2311, and the head portion of the cotter 2312 is pressed against the inner peripheral surface of the heat transfer tube 132 so as to come into friction-contact therewith. Accordingly, the cotter 2312 clamps and holds the heat transfer tube 132.

Next, in a state where the cotter 2312 comes into friction-contact with the heat transfer tube 132, the clamp mechanism 231 further pressurizes the working fluid of the first fluid chamber 2315*a* of the rod cylinder 2315 (see FIG. 2(*d*)). Then, since the piston rod 2313 is fixed to the heat transfer tube 132 through the cotter 2312, the clamp body 2311 pulls the piston rod 2313 toward the rear end portion, so that the entire clamper 23 is lifted upward. Accordingly, a gap g between the contact portion 2311*b* of the clamp body 2311 and the opening edge portion 132*a* of the heat transfer tube 132 is closed so that the contact portion 2311*b* of the clamp mechanism 231 is pressed against the opening edge portion 132*a* of the heat transfer tube 132 so as to come into plane-contact therewith. Specifically, the rod cylinder 2315, the clamp body 2311 integrated with the rod cylinder 2315, the lifting and lowering cylinder 2321 engaging with the clamp body 2311, and the base 2 connected to the lifting and lowering cylinder 2321 are all pulled by the fluid pressure of the rod cylinder 2315 so as to be lifted. Further, at this time, the position of the slit 2311*c* moves toward the front end portion of the clamp body 2311 with respect to the cotter 2312 by the axial displacement of the clamp body 2311. Further, the elastic body 2314 between the clamp body 2311 and the cotter 2312 is deformed in a compressed state.

Then, the plurality of clampers 23 (23a and 23b) which are installed in the base 2 clamp and hold the heat transfer tube 132 as described above, so that the base 2 is fixed to the tube sheet surface 137a in a suspended state (see FIG. 20). At this time, since the respective clampers 23 clamp and hold the heat transfer tubes 132 by causing the contact portion 2311b to come into close contact with the opening edge portion 132a of the heat transfer tube 132 (the tube sheet surface 137a) (see FIG. 2(d)), the base 2 is properly fixed to the tube sheet surface 137a. Accordingly, the in-channel-head operation device 1 is stably installed in the tube sheet surface 137a during the operation inside the water chamber.

[Process of Unclamping Heat Transfer Tube]

Figure 3:
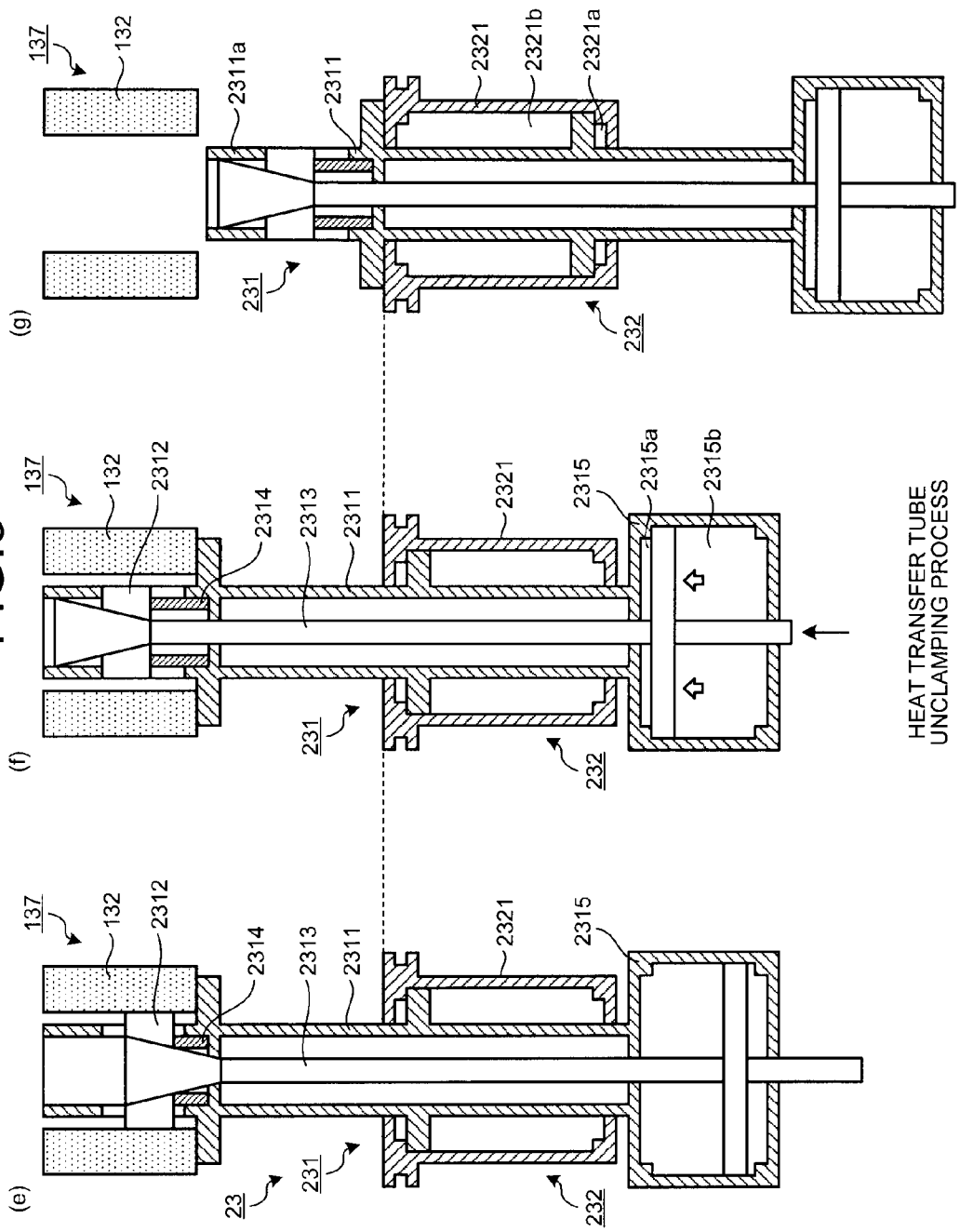
FIG. 3 is a diagram illustrating an unclamping process of the clamper described in FIG. 1.

FIG. 3 is a diagram illustrating a process of unclamping the clamper described in FIG. 1. The same drawing illustrates a state where the clampers 23a and 23b unclamp the heat transfer tubes 132 in a process in which the in-channel-head operation device 1 is removed from the water chamber 131 (a removing process).

When the clamper 23 unclamps the heat transfer tube 132, in a state where the clamper 23 clamps and holds the heat transfer tube 132 (see FIG. 3(e)), the clamp mechanism 231 pressurizes the working fluid of the second fluid chamber 2315b of the rod cylinder 2315 and depressurizes the working fluid of the first fluid chamber 2315a thereof (see FIG. 3(f)). Then, the piston rod 2313 is pressed toward the front end portion of the clamp body 2311 and the cotter 2312 is accommodated inside the clamp body 2311 while decreasing in diameter. Further, the compression state of the elastic body 2314 is released, so that the elastic body 2314 is restored. Accordingly, the clamp body 2311 may be extracted from the heat transfer tube 132.

Next, the lifting and lowering mechanism 232 pressurizes the working fluid of the second fluid chamber 2321b of the lifting and lowering cylinder 2321 and depressurizes the working fluid of the first fluid chamber 2321a so as to lower the clamp mechanism 231 (see FIG. 3(g)). Accordingly, the insertion portion 2311a of the clamp body 2311 is extracted from the heat transfer tube 132, so that the clamping and holding of the heat transfer tube 132 is released.

Then, the plurality of clampers 23 (22a and 23b) installed in the base 2 release the clamping and holding of the heat transfer tube 132, so that the base 2 may be separated from the tube sheet surface 137a. Further, since the base 2 is held so as to be hung by the wire 12 of the base carrying attachment fixture 11 in this state, the falling of the base 2 is prevented (see FIG. 20).

Furthermore, in the embodiment, in a state where the clamper 23 clamps and holds the heat transfer tube 132, the piston rod 2313 passes through the rod cylinder 2315 and protrudes toward the rear end portion of the rod cylinder 2315 (see FIG. 3(e)). In such a configuration, when the piston rod 2313 does not come off from the cotter 2312 due to the fitting thereto upon unclamping the heat transfer tube 132, the piston rod 2313 may be separated from the cotter 2312 by beating the rear end portion of the piston rod 2313 from the outside. Accordingly, it is possible to perform the unclamping process in an emergency state.

[Fluid Pressure Control Mechanism of Rod Cylinder]

Figure 4:
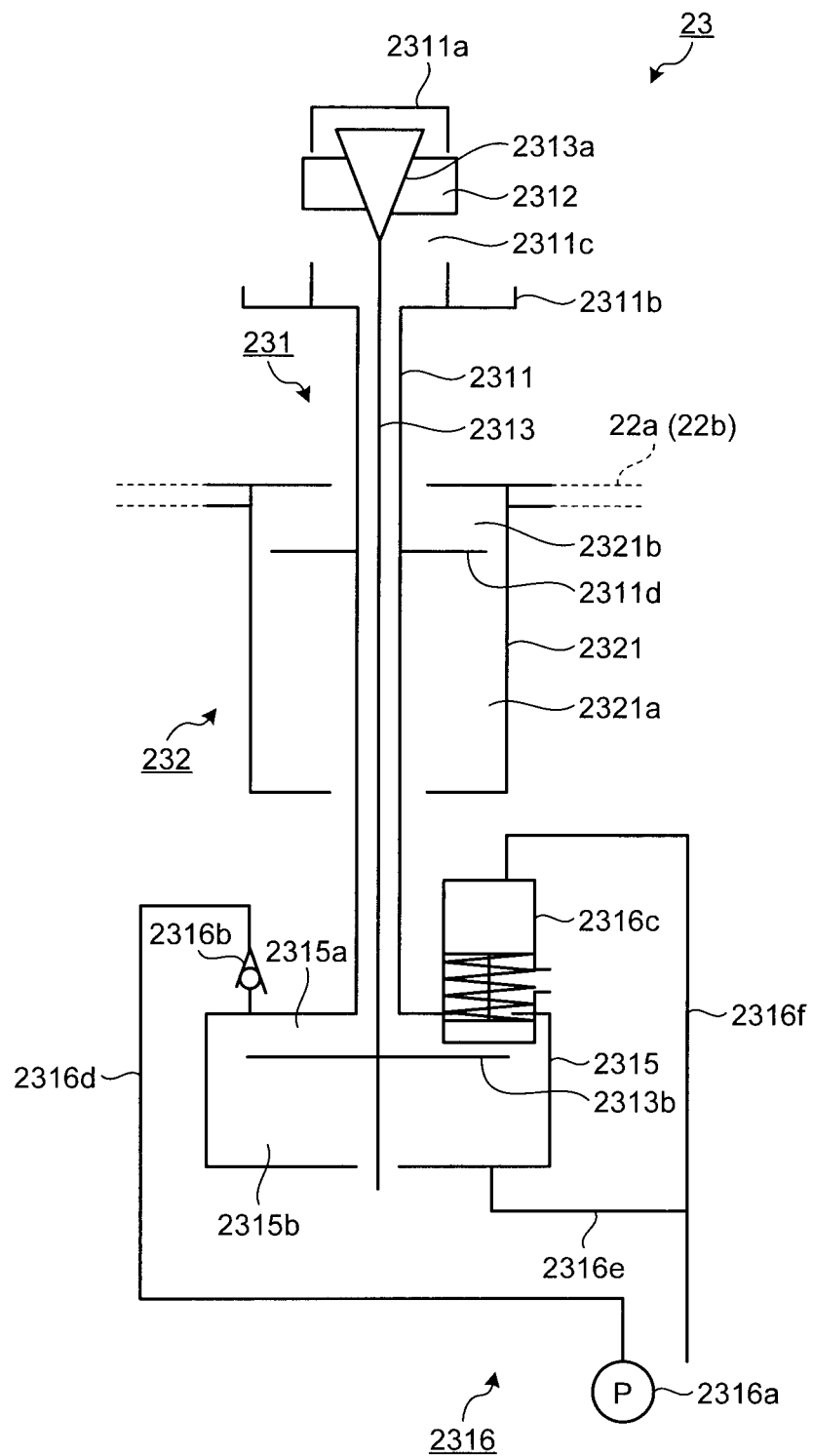
FIG. 4 is a schematic diagram illustrating a specific example of the clamper described in FIG. 1.
Figure 5:
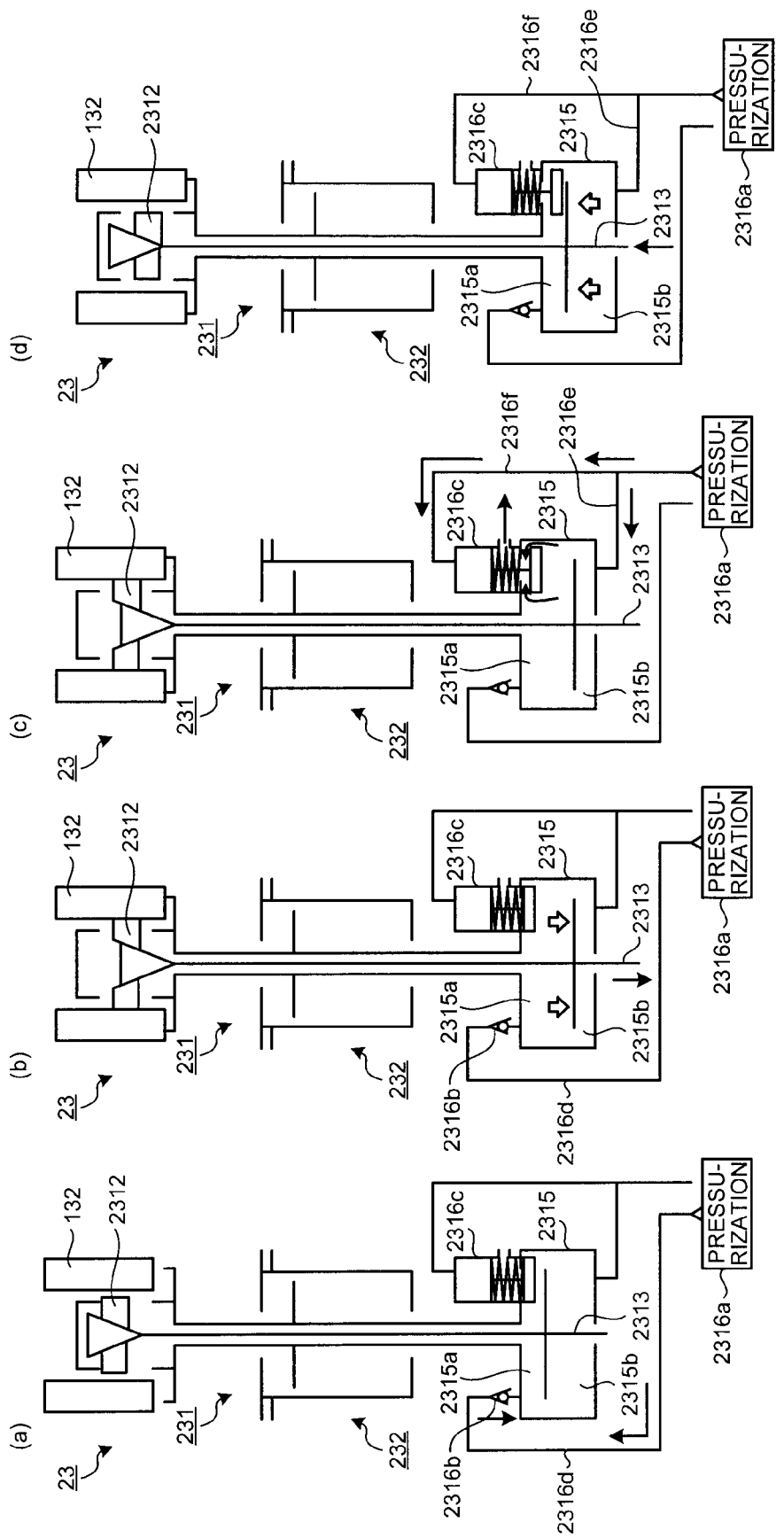
FIG. 5 is a diagram illustrating an operation of the clamper described in FIG. 4.

FIG. 4 is a schematic diagram illustrating a specific example of the clamper described in FIG. 1. FIG. 5 is a diagram illustrating an operation of the clamper described in FIG. 4. These drawings illustrate a configuration (FIG. 4) and an effect (FIG. 5) of the fluid pressure control mechanism of the rod cylinder 2315.

As illustrated in FIG. 4, in the clamper 23, the clamp mechanism 231 includes a fluid pressure control mechanism 2316 which controls the fluid pressure of the rod cylinder 2315. The fluid pressure control mechanism 2316 includes a pressurizing pump 2316a, a check valve 2316b, and a release valve 2316c, and these are connected to the rod cylinder 2315 through tubes 2316d to 2316f. The pressurizing pump 2316a is a pump which pressurizes a working fluid (for example, air) of the rod cylinder 2315. The pressurizing pump 2316a is connected to the first fluid chamber 2315a of the rod cylinder 2315 through the tube 2316d, and is connected to the second fluid chamber 2315b of the rod cylinder 2315 through the tube 2316e. Further, the pressurizing pump 2316a may selectively pressurize the working fluids of the first fluid chamber 2315a and the second fluid chamber 2315b of the rod cylinder 2315. The check valve 2316b is disposed on the tube 2316d near the first fluid chamber 2315a of the rod cylinder 2315 so as to prevent the reverse flow of the working fluid from the first fluid chamber 2315a. The release valve 2316c is a valve which releases the working fluid of the first fluid chamber 2315a of the rod cylinder 2315 to the outside, and is installed in the first fluid chamber 2315a. The release valve 2316c is connected to the pressurizing pump 2316a through the tube 2316f, and is driven by the pressurizing pump 2316a so as to be opened and closed.

In the process of clamping the heat transfer tube 132, the pressurizing pump 2316a pressurizes the working fluid of the first fluid chamber 2315a of the rod cylinder 2315 (see FIG. 5(a)). At this time, the release valve 2316c is closed. Thus, the fluid pressure of the first fluid chamber 2315a increases, so that the piston rod 2313 is lowered. Accordingly, the cotter 2312 increases in diameter so as to clamp and hold the heat transfer tube 132 (see FIG. 5(b)). At this time, the check valve 2316b prevents the reverse flow of the working fluid from the first fluid chamber 2315a. Thus, even when the pressurizing pump 2316a is stopped, the fluid pressure of the first fluid chamber 2315a is maintained, so that the state where the heat transfer tube 132 is clamped is appropriately maintained. By the check valve 2316b, it is possible to realize the fail-safe for maintaining the state where the heat transfer tube 132 is clamped, for example, when air leaks from the tube 2316d which connects the pressurizing pump 2316a to the first fluid chamber 2315a during the operation inside the water chamber.

In the process of unclamping the heat transfer tube 132, the pressurizing pump 2316a pressurizes the working fluid of the second fluid chamber 2315b and depressurizes the working fluid of the first fluid chamber 2315a by opening the release valve 2316c (see FIG. 5(c)). At the same time, the fluid pressure of the second fluid chamber 2315b increases, so that the piston rod 2313 is lifted. Accordingly, the cotter 2312 decreases in diameter, so that the state where the heat transfer tube 132 is clamped is released (see FIG. 5(d)). Furthermore, in the embodiment, air is used as the working fluid of the rod cylinder 2315. For this reason, the working fluid of the first fluid chamber 2315a is directly discharged from the release valve 2316c into the water chamber 131.

[Cotter Diameter Decreasing Structure]

Figure 6:
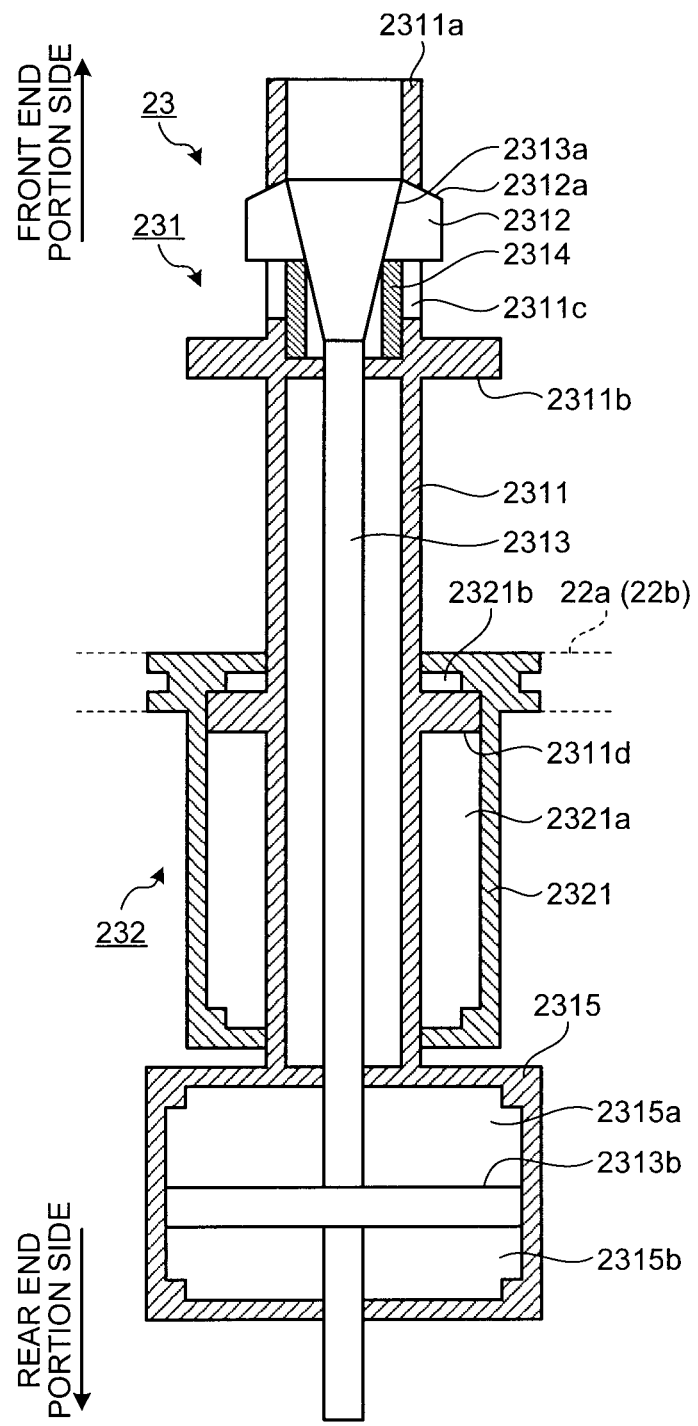
FIG. 6 is a diagram illustrating a cotter diameter decreasing structure of the clamper described in FIG. 1.
Figure 7:
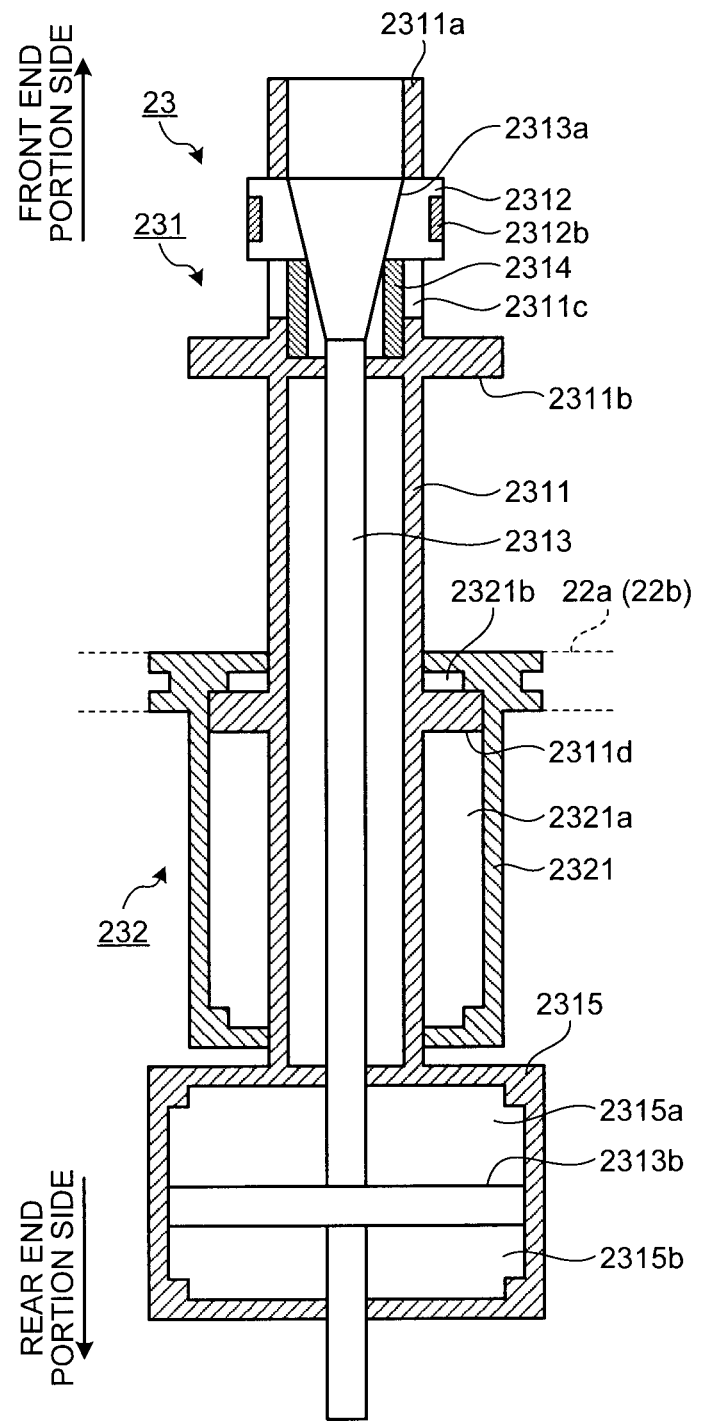
FIG. 7 is a diagram illustrating a cotter diameter decreasing structure of the clamper described in FIG. 1.

FIGS. 6 and 7 are diagrams illustrating a cotter diameter decreasing structure of the clamper described in FIG. 1. These drawings illustrate a structure which decreases the diameter of the cotter 2312 of the clamp mechanism 231 in the process of unclamping the clamper 23.

In the clamper 23 illustrated in FIG. 6, the cotter 2312 includes a tapered surface 2312a, and the tapered surface 2312a is disposed toward the front end portion of the clamp body 2311 inside the slit 2311c of the clamp body 2311. Further, the elastic body 2314 is biased to the rear end portion of the cotter 2312 while being supported by the clamp body 2311. By the biasing force of the elastic body 2314, the cotter 2312 presses the tapered surface 2312a against the wall surface near the front end portion of the slit 2311c.

In a state where the heat transfer tube 132 is clamped (see FIG. 3(e)), the piston rod 2313 is pulled so as to be lowered, and protrudes from the slit 2311c of the clamp body 2311 while increasing the diameter of the cotter 2312 (see FIG. 6). At this time, the elastic body 2314 is compressed. Next, in the process of unclamping the heat transfer tube 132, when the piston rod 2313 is lifted (see FIG. 3(f)), the elastic body 2314 presses the cotter 2312 against the wall surface near the front end portion of the slit 2311c (see FIG. 6). Accordingly, the cotter 2312 decreases in diameter while sliding inside the slit 2311c along the tapered surface 2312a (not illustrated). Accordingly, the cotter 2312 is accommodated inside the clamp body 2311.

In the clamper 23 illustrated in FIG. 7, the cotter 2312 includes an annular elastic member 2312b. The elastic member 2312b is formed by, for example, an annular plate spring and a rubber-like O-ring, and is fitted to the outer peripheral surface of the cotter 2312 (the outside in the radial direction), so that an elastic force is applied to the cotter 2312 inward in the radial direction.

In a state where the heat transfer tube 132 is clamped (see FIG. 3(e)), the piston rod 2313 is pulled so as to be lowered, and protrudes from the slit 2311c of the clamp body 2311 while increasing the diameter of the cotter 2312 (see FIG. 7). At this time, the elastic member 2312b is lengthened by an increase in the diameter of the cotter 2312. Next, in the process of unclamping the heat transfer tube 132, when the piston rod 2313 is lifted (see FIG. 3(f)), the elastic member 2312b is shortened and the cotter 2312 decreases in diameter (not illustrated). Accordingly, the cotter 2312 is accommodated inside the clamp body 2311.

First Modified Example of Cotter Diameter Decreasing Structure

Figure 8:
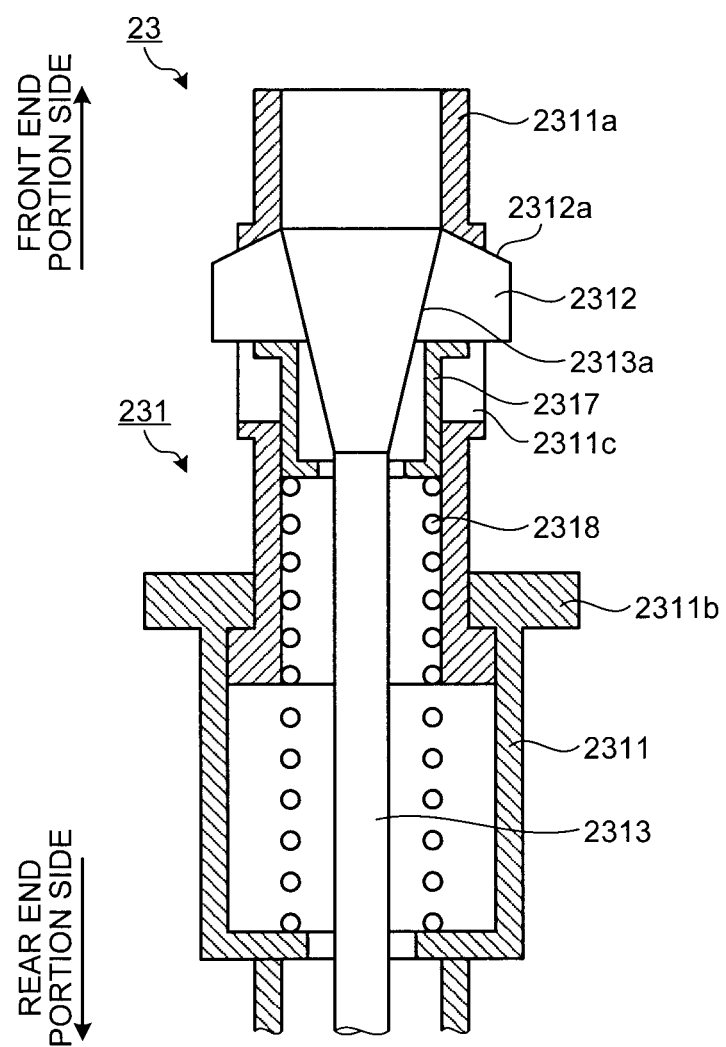
FIG. 8 is a diagram illustrating a modified example of the cotter diameter decreasing structure described in FIG. 6.
Figure 9:
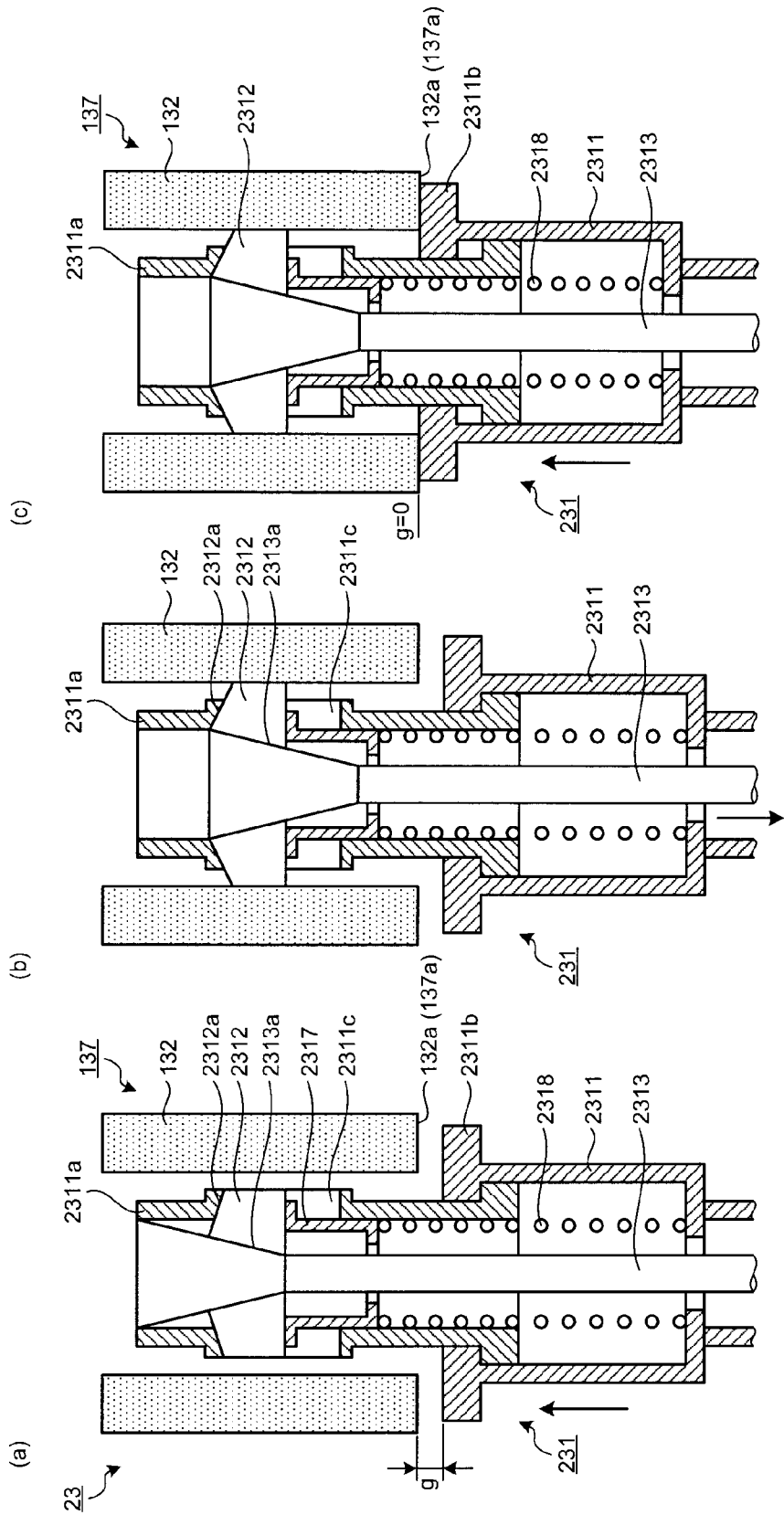
FIG. 9 is a diagram illustrating a modified example of the cotter diameter decreasing structure described in FIG. 6.
Figure 10:
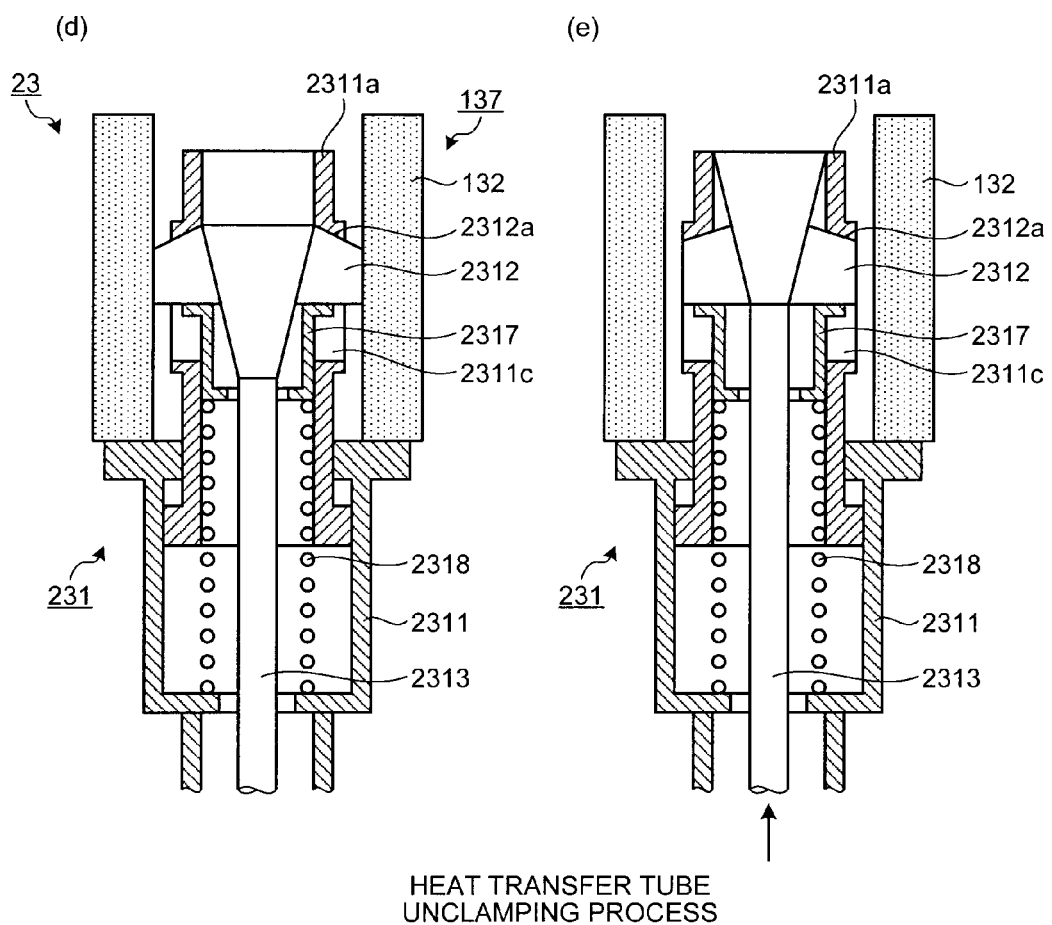
FIG. 10 is a diagram illustrating a modified example of the cotter diameter decreasing structure described in FIG. 6.

FIGS. 8 to 10 are diagrams illustrating a first modified example of the cotter diameter decreasing structure described in FIG. 6. These drawings respectively indicate a main enlarged view of the cotter diameter decreasing structure (see FIG. 8), an operation diagram in the clamping process (see FIG. 9), and an operation diagram in the unclamping process (see FIG. 10).

The clamper 23 illustrated in FIG. 8 has the following difference compared to the clamper 23 illustrated in FIG. 6. That is, the insertion portion 2311a of the clamp body 2311 is separated from the clamp body 2311. Specifically, the insertion portion 2311a is formed by a tube member having the slit 2311c, and is disposed so as to be movable in a reciprocating manner in the axial direction while being inserted into the front end portion of the clamp body 2311. Further, the cotter 2312 is inserted into the slit 2311c of the insertion portion 2311a, and is disposed inside the slit 2311c so as to be movable in a reciprocating manner in the axial direction and the radial direction of the insertion portion 2311a. Further, the cotter 2312 includes the tapered surface 2312a, and the tapered surface 2312a is disposed so as to face the front end portion of the clamp body 2311. Further, the rear end portion of the cotter 2312 is provided with a support member 2317 which supports the cotter 2312. The support member 2317 is a tube member which has a flange-shaped front end portion, and is disposed so that the front end portion thereof contacts the rear end portion of the cotter 2312. Further, the support member 2317 is inserted into the insertion portion 2311a, and is disposed inside the slit 2311c so as to be movable in a reciprocating manner in the axial direction of the insertion portion 2311a. Further, an elastic body 2318 is disposed so as to be interposed between the rear end portion of the support member 2317 and the clamp body 2311. The elastic body 2318 is formed by, for example, a coil spring or a rubber tube, and is biased to the rear end portion of the support member 2317 while being supported by the clamp body 2311. By the biasing force of the elastic body 2318, the support member 2317 is held while pressing the cotter 2312 against the wall surface near the front end portion of the slit 2311c, and the insertion portion 2311a is held so as to protrude from the front end portion of the clamp body 2311 in the axial direction.

In the clamping process, the lifting and lowering mechanism 232 lifts the clamp mechanism 231, so that the clamp mechanism 231 inserts the insertion portion 2311a into the heat transfer tube 132 (see FIGS. 9(a) and 2(b)). At this time, the contact portion 2311b of the clamp body 2311 and the opening edge portion 132a of the heat transfer tube 132 (the tube sheet surface 137a) come into close contact with each other (a gap g may be formed depending on the conditions).

Next, the clamp mechanism 231 pulls the piston rod 2313 toward the rear end portion so as to be lowered (see FIGS. 9(b) and 2(c)). Then, the tapered surface 2313a of the piston rod 2313 presses and opens the cotter 2312, so that the cotter 2312 increases in diameter. Then, the cotter 2312 protrudes from the slit 2311c of the insertion portion 2311a, and the head portion of the cotter 2312 is pressed against the inner peripheral surface of the heat transfer tube 132 so as to come into friction-contact therewith. At this time, the support member 2317 displaces toward the rear end portion of the clamp body 2311 inside the slit 2311c, so that the cotter 2312 may displace while sliding along the tapered surface 2312a.

Next, in a state where the cotter 2312 comes into friction-contact with the heat transfer tube 132, the clamp mechanism 231 further pulls the piston rod 2313 toward the rear end portion (see FIGS. 9(c) and 2(d)). Then, since the piston rod 2313 is fixed to the heat transfer tube 132 through the cotter 2312, the entire clamper 23 is lifted upward. At this time, since the clamp body 2311 and the insertion portion 2311a are separated from each other, the clamp body 2311 displaces in a sliding manner toward the front end portion in the axial direction with respect to the insertion portion 2311a. Accordingly, a gap g between the contact portion 2311b of the clamp body 2311 and the opening edge portion 132a of the heat transfer tube 132 is closed so that the contact portion 2311b is pressed against the opening edge portion 132a of the heat transfer tube 132 so as to come into plane-contact therewith. Further, the elastic body 2318 between the clamp body 2311 and the support member 2317 is deformed in a compressed state by the axial displacement of the clamp body 2311.

In the unclamping process, when the piston rod 2313 is lifted while the clamper 23 clamps the heat transfer tube 132, the pressing force from the piston rod 2313 to the cotter 2312 is released (see FIGS. 10(d) and 10(e)). Then, since the support member 2317 presses the cotter 2312 against the clamp body 2311 (the wall surface near the front end portion of the slit 2311c) by the biasing force of the elastic body 2318, the cotter 2312 decreases in diameter while sliding inside the slit 2311c along the tapered surface 2312a. Accordingly, the cotter 2312 is accommodated inside the clamp body 2311.

Second Modified Example of Cotter Diameter Decreasing Structure

Figure 11:
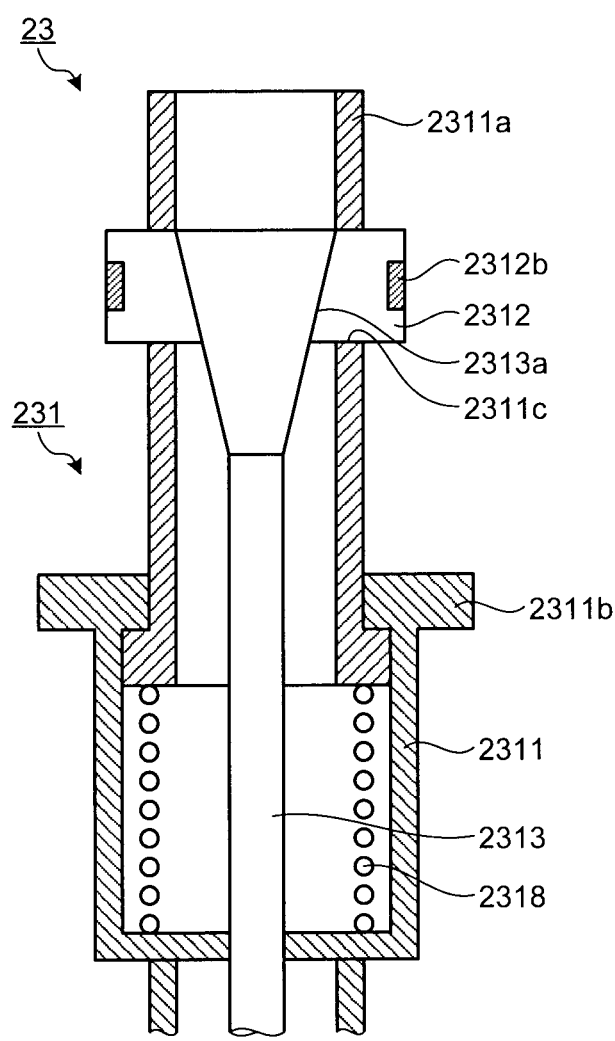
FIG. 11 is a diagram illustrating a modified example of the cotter diameter decreasing structure described in FIG. 7.
Figure 12:
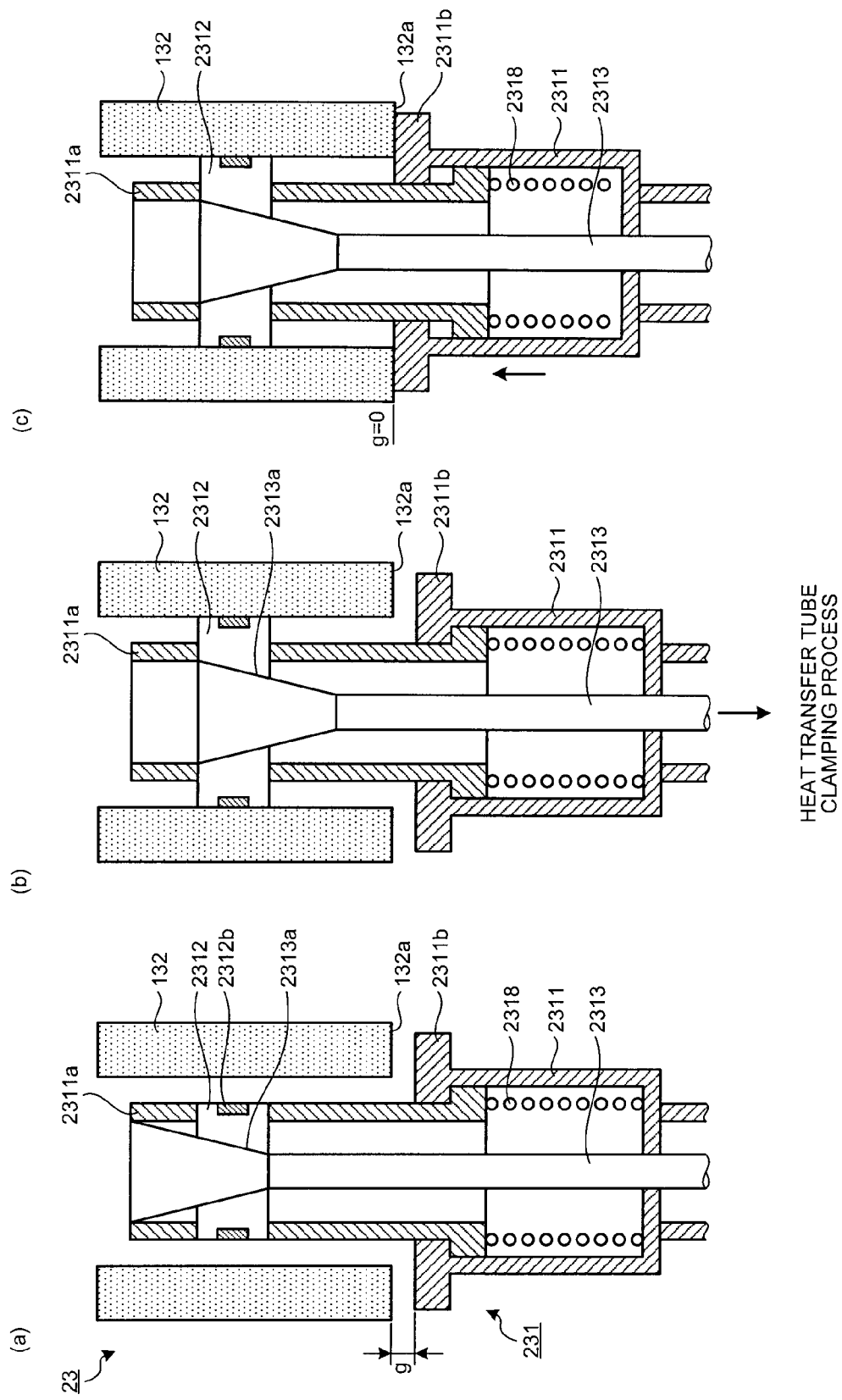
FIG. 12 is a diagram illustrating a modified example of the cotter diameter decreasing structure described in FIG. 7.
Figure 13:
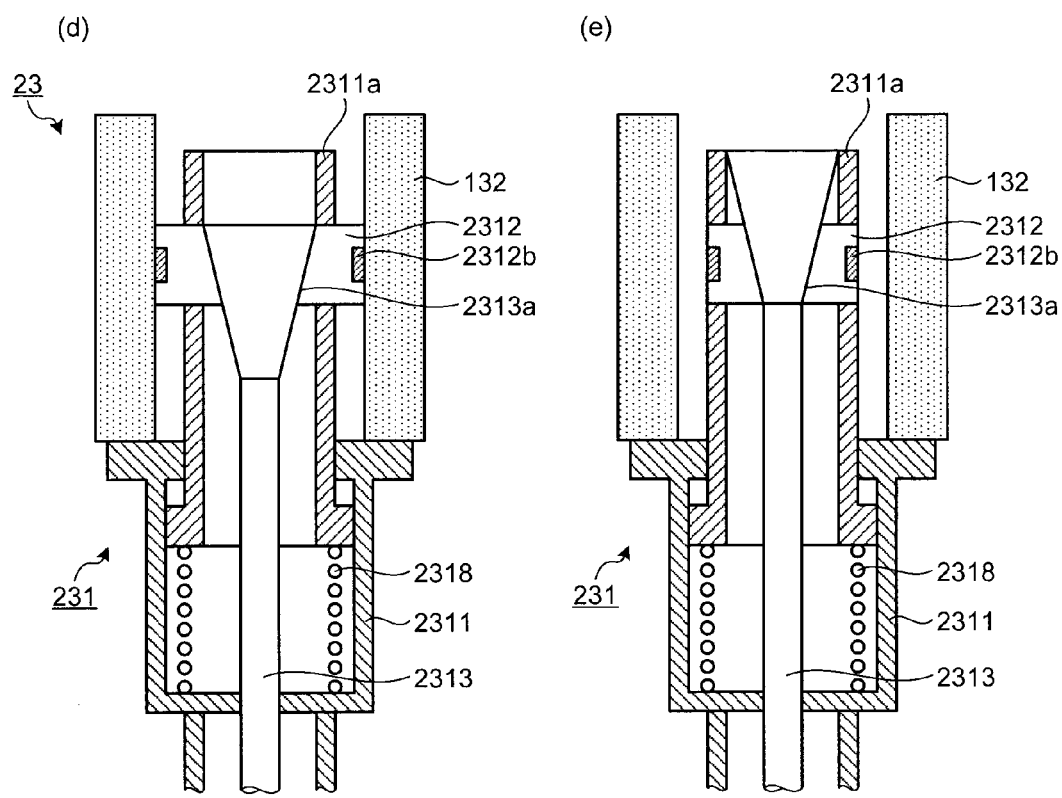
FIG. 13 is a diagram illustrating a modified example of the cotter diameter decreasing structure described in FIG. 7.

FIGS. 11 to 13 are diagrams illustrating a second modified example of the cotter diameter decreasing structure described in FIG. 7. These drawings respectively indicate a main enlarged diagram of the cotter diameter decreasing structure (FIG. 11), an operation diagram in the clamping process (FIG. 12), and an operation diagram in the unclamping process (FIG. 13).

The clamper 23 illustrated in FIG. 11 has the following difference compared to the clamper 23 illustrated in FIG. 7. That is, the insertion portion 2311a of the clamp body 2311 is separated from the clamp body 2311. Specifically, the insertion portion 2311a is formed by a tube member having the slit 2311c, and is disposed so as to be movable in a reciprocating manner in the axial direction while being inserted into the front end portion of the clamp body 2311. Further, the elastic body 2318 is disposed so as to be interposed between the insertion portion 2311a and the clamp body 2311. Since the elastic body 2318 is biased to the insertion portion 2311a, the insertion portion 2311a is held so as to protrude from the front end portion of the clamp body 2311 in the axial direction. Further, the cotter 2312 is inserted into the slit 2311c of the insertion portion 2311a, and is disposed inside the slit 2311c so as to be movable in a reciprocating manner only in the radial direction of the insertion portion 2311a. Then, the annular elastic member 2312b which decreases the diameter of the cotter 2312 is fitted to the outer peripheral surface of the cotter 2312 (the outside in the radial direction).

In the clamping process, the lifting and lowering mechanism 232 lifts the clamp mechanism 231, so that the clamp mechanism 231 inserts the insertion portion 2311a into the heat transfer tube 132 (see FIGS. 12(a) and 2(b)). At this time, the contact portion 2311b of the clamp body 2311 and the opening edge portion 132a of the heat transfer tube 132 (the tube sheet surface 137a) come into close contact with each other (a gap g may be generated depending on the conditions).

Next, the clamp mechanism 231 pulls the piston rod 2313 toward the rear end portion so as to be lowered (see FIGS. 12(b) and 2(c)). Then, the tapered surface 2313a of the piston rod 2313 presses and opens the cotter 2312, so that the cotter 2312 increases in diameter. Then, the cotter 2312 protrudes from the slit 2311c of the insertion portion 2311a, so that the head portion of the cotter 2312 is pressed against the inner peripheral surface of the heat transfer tube 132 so as to come into friction-contact therewith.

Next, in a state where the cotter 2312 comes into friction-contact with the heat transfer tube 132, the clamp mechanism 231 further pulls the piston rod 2313 toward the rear end portion (see FIG. 12(c)). Then, since the piston rod 2313 is fixed to the heat transfer tube 132 through the cotter 2312, the entire clamper 23 is lifted upward. Further, since the clamp body 2311 is separated from the insertion portion 2311a, the clamp body 2311 displaces in a sliding manner with respect to the insertion portion 2311a. Accordingly, a gap g between the contact portion 2311b of the clamp body 2311 and the opening edge portion 132a of the heat transfer tube 132 is closed, so that the contact portion 2311b is pressed against the opening edge portion 132a of the heat transfer tube 132 so as to come into plane-contact therewith.

Further, the elastic body 2318 between the clamp body 2311 and the insertion portion 2311a is deformed in a compressed state by the axial displacement of the clamp body 2311.

In the unclamping process, when the piston rod 2313 is lifted while the clamper 23 clamps the heat transfer tube 132, the pressing force from the piston rod 2313 to the cotter 2312 is released (see FIGS. 13(d) and 13(e)). Then, the elastic member 2312b is shortened so as to decrease the diameter of the cotter 2312 (not illustrated). Accordingly, the cotter 2312 is accommodated inside the clamp body 2311.

Figure 14:
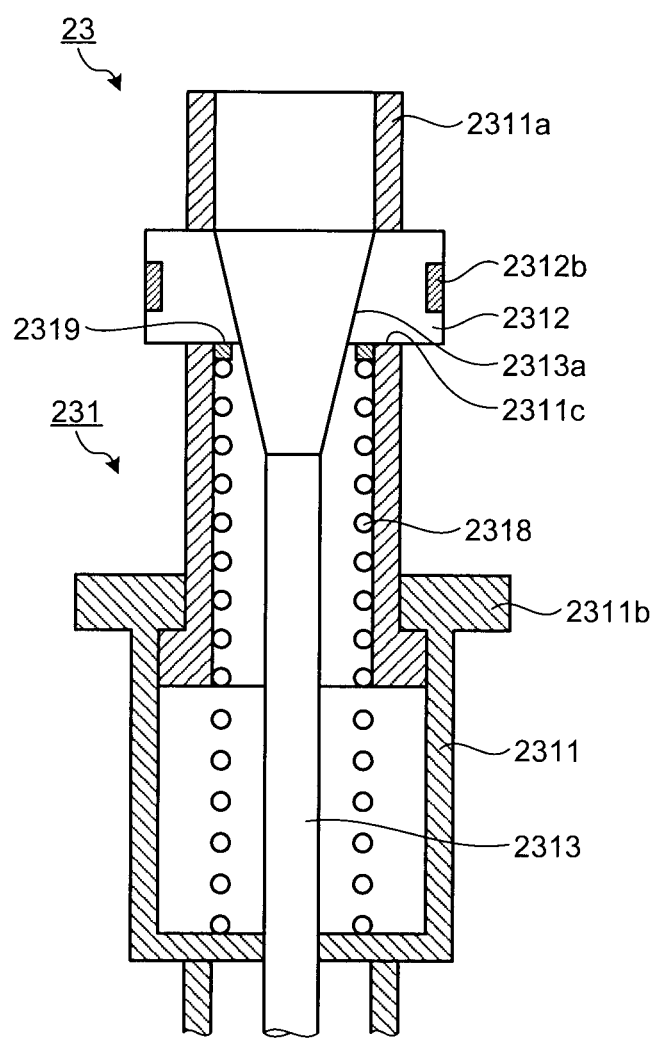
FIG. 14 is a diagram illustrating a modified example of the cotter diameter decreasing structure described in FIG. 11.

Furthermore, in the second modified example of the cotter diameter decreasing structure, the elastic body 2318 is disposed so as to be interposed between the rear end portion of the insertion portion 2311a and the inner bottom portion of the clamp body 2311 (see FIG. 11). However, the invention is not limited thereto, and the elastic body 2318 may be disposed so as to be interposed between a cotter brace 2319 supporting the rear end portion of the cotter 2312 and the inner bottom portion of the clamp body 2311 (see FIG. 14). In the case of such a configuration, the biasing force of the elastic body 2318 presses the front end portion of the slit 2311c through the cotter brace 2319 and the cotter 2312, and hence the insertion portion 2311a may protrude from the clamp body 2311, whereby the same function may be obtained.

[Effect]

As described above, the clamper 23 includes the clamp mechanism 231 which inserts the insertion portion 2311a into the tube member 132 (the heat transfer tube 132) and clamps the tube member 132 and the lifting and lowering mechanism 232 which lifts and lowers the clamp mechanism 231 in the insertion direction of the insertion portion 2311a (see FIGS. 1 and 2). Further, the clamp mechanism 231 includes the clamp body 2311 which has the insertion portion 2311a, the cotter 2312 which protrudes from the insertion portion 2311a so as to come into friction-contact with the tube member 132 and to be movable in a reciprocating manner in the insertion direction of the insertion portion 2311a, the piston rod 2313 which presses the cotter 2312 so that the cotter protrudes from the insertion portion 2311a when being pulled toward the opposite side to the insertion direction of the insertion portion 2311a, and the rod cylinder 2315 which is integrated with the clamp body 2311 and pulls the piston rod 2313.

In such a configuration, the lifting and lowering mechanism 232 lifts the clamp mechanism 231 so that the insertion portion 2311a of the clamp mechanism 231 is inserted into the tube member 132 (see FIG. 2). Then, when the rod cylinder 2315 pulls the piston rod 2313 toward the opposite side to the insertion direction of the insertion portion 2311a (toward the rear end portion), the piston rod 2313 presses the cotter 2312 so that the cotter protrudes from the insertion portion 2311a. Then, the cotter 2312 is pressed against the inner peripheral surface of the tube member 132 so as to come into friction-contact therewith, thereby clamping the tube member 132. Accordingly, there is an advantage that the tube member 132 may be stably clamped.

Further, in the clamper 23, the piston rod 2313 passes through the rod cylinder 2315 and protrudes toward the rear end portion of the rod cylinder 2315 (see FIG. 1).

In such a configuration, when the piston rod 2313 does not come off from the cotter 2312 due to the fitting thereto upon unclamping the tube member 132, the piston rod 2313 may be separated from the cotter 2312 by beating the rear end portion of the piston rod 2313 from the outside. Accordingly, there is an advantage that the unclamping process may be performed in an emergency state.

Further, the clamper 23 includes the pressurizing device (the pressurizing pump 2316a) which is connected through the tube 2316d to the fluid chamber (the first fluid chamber 2315a) that pulls the piston rod 2313 by the pressurization of the working fluid among the fluid chambers of the rod cylinder 2315 (the first fluid chamber 2315a and the second fluid chamber 2315b) and which pressurizes the working fluid of the fluid chamber 2315a, the check valve 2316b which is disposed on the tube 2316d, and the release valve 2316c which discharges the working fluid of the fluid chamber 2315a (see FIG. 4).

In such a configuration, the pressurizing device 2316a pressurizes the working fluid of the fluid chamber 2315a, so that the rod cylinder 2315 is lowered and the cotter 2312 clamps and holds the heat transfer tube 132 (see FIGS. 5(a) and 5(b)). At this time, the check valve 2316b prevents the reverse flow of the working fluid from the fluid chamber 2315a in a state where the release valve 2316c is closed. Thus, even when the pressurizing device 2316a is stopped during the operation inside the water chamber (when clamping the heat transfer tube 132), the fluid pressure of the fluid chamber 2315a is maintained, so that the state where the heat transfer tube 132 is clamped is appropriately maintained. Accordingly, it is possible to realize the fail-safe when the original pressure of the working fluid of the clamper 23 is interrupted.

Further, in the clamper 23, the clamp mechanism 231 includes a cotter diameter decreasing structure which decreases the diameter of the cotter 2312 (see FIGS. 6 to 8 and FIG. 11).

In such a configuration, since the cotter 2312 may be accommodated inside the insertion portion 2311a while decreasing in diameter when unclamping the clamper 23, there is an advantage that the insertion portion 2311a may be easily extracted from the tube member 132.

Further, in the clamper 23, the cotter diameter decreasing structure includes the tapered surface 2312a which is formed in the cotter 2312 and the elastic body 2318 which presses the tapered surface 2312a against the wall surface near the front end portion of the slit 2311c so as to bias the cotter 2312 to the clamp body 2311, and also decreases the diameter of the cotter 2312 by sliding the cotter along the tapered surface 2312a by the biasing force from the elastic body 2318 (see FIGS. 6 and 8).

In such a configuration, there is an advantage that the cotter diameter decreasing structure may be realized by a simple configuration with the tapered surface 2312a of the cotter 2312 and the elastic body 2318.

Further, in the clamper 23, the cotter diameter decreasing structure is formed by the annular elastic member 2312b which is fitted to the outer periphery of the cotter 2312 (see FIGS. 7 and 11).

In such a configuration, there is an advantage that the cotter diameter decreasing structure may be realized by a simple configuration with the annular elastic member 2312b.

INDUSTRIAL APPLICABILITY

As described above, the clamper according to the invention is useful in that the tube member may be stably clamped.

REFERENCE SIGNS LIST

1 IN-CHANNEL-HEAD OPERATION DEVICE
2 BASE
3 INTERMEDIATE LINK
4 MANIPULATOR
5 TOOL
11 BASE CARRYING ATTACHMENT FIXTURE
12 WIRE OR BELT
21 BASE BODY
22a, 22b WING
23, 23a, 23b CLAMPER
130 STEAM GENERATOR
131 WATER CHAMBER
132 HEAT TRANSFER TUBE (TUBE MEMBER)
132a OPENING EDGE PORTION
134 PARTITION PLATE
135 INLET TUBE STAND
136 OUTLET TUBE STAND
137 TUBE SHEET
137a TUBE SHEET SURFACE
138 MANHOLE
231 CLAMP MECHANISM
2311 CLAMP BODY
2311a INSERTION PORTION
2311b CONTACT PORTION
2311c SLIT
2311d PISTON PORTION
2312 COTTER
2312a TAPERED SURFACE
2312b ELASTIC MEMBER
2313 PISTON ROD
2313a TAPERED SURFACE
2313b PISTON PORTION
2314 ELASTIC BODY
2315 ROD CYLINDER
2315a FIRST FLUID CHAMBER
2315b SECOND FLUID CHAMBER
2316 FLUID PRESSURE CONTROL MECHANISM
2316a PRESSURIZING PUMP
2316b CHECK VALVE
2316c RELEASE VALVE
2316d to 2316f TUBE
2317 SUPPORT MEMBER
2318 ELASTIC BODY
2319 COTTER BRACE
232 LIFTING AND LOWERING MECHANISM
2321 LIFTING AND LOWERING CYLINDER
2321a FIRST FLUID CHAMBER
2321b SECOND FLUID CHAMBER

The invention claimed is:

1. A clamper comprising:
a clamp mechanism which inserts an insertion portion into a tube member as a subject workpiece and clamps the tube member; and
a lifting and lowering mechanism which lifts and lowers the clamp mechanism in an insertion direction of the insertion portion, wherein the clamp mechanism comprises:
a clamp body which includes the insertion portion at a distal end thereof;
a cotter which protrudes from the insertion portion so as to come into friction-contact with the tube member and is disposed so as to be movable in a reciprocating manner in the insertion direction of the insertion portion;
a piston rod which presses the cotter so that the cotter protrudes from the insertion portion when being pulled toward the opposite side to the insertion direction of the insertion portion; and
a rod cylinder which is unitarily formed on a rear end portion of the clamp body and pulls the piston rod, wherein the lifting and lowering mechanism comprises a lifting and lowering cylinder which is fixed to a wing of a base and inside which the clamp body is disposed such that the clamp body is movable with respect to the lifting and lowering cylinder in the insertion direction, wherein the rod cylinder is disposed outside the lifting and lowering cylinder, and wherein the piston rod is disposed to penetrate the rod cylinder, is movable with respect to the rod cylinder in the insertion direction, and includes a piston portion which is disposed inside the rod cylinder to move the piston rod in the insertion direction by using fluid pressure.

2. The clamper according to claim 1, further comprising: a pressurizing device which is connected through a tube to a fluid chamber that pulls the piston rod by the pressurization of a working fluid of the rod cylinder and pressurizes the working fluid of the fluid chamber; a check valve which is disposed on the tube; and a release valve which discharges the working fluid of the fluid chamber.

3. The clamper according to claim 1, wherein the clamp mechanism includes a cotter diameter decreasing structure which decreases the diameter of the cotter.

4. The clamper according to claim 3, wherein the cotter diameter decreasing structure includes a tapered surface which is formed on the cotter and an elastic member which biases the tapered surface to the clamp body and decreases the diameter of the cotter by sliding the cotter along the tapered surface by the biasing force from the elastic member.

5. The clamper according to claim 3, wherein the cotter diameter decreasing structure includes an annular elastic member which is fitted to the outer periphery of the cotter.

6. An in-channel-head operation device comprising: the clamper according to claim 1.

* * * * *